United States Patent
Aria et al.

(10) Patent No.: US 10,311,902 B2
(45) Date of Patent: Jun. 4, 2019

(54) MEASURING AND ANALYZING ELECTRICAL RESISTANCE IN TUNNELING MAGNETORESIST SENSORS TO IDENTIFY DAMAGED SENSORS

(71) Applicant: International Business Machines Corporation, Armonk, NY (US)

(72) Inventors: Milad Aria, Morgan Hill, CA (US);
Icko E. T. Iben, Santa Clara, CA (US);
Guillermo F. Paniagua, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 14/501,090

(22) Filed: Sep. 30, 2014

(65) Prior Publication Data

US 2016/0093320 A1    Mar. 31, 2016

(51) Int. Cl.
*G11B 5/39* (2006.01)
*G11B 5/455* (2006.01)

(52) U.S. Cl.
CPC ............ *G11B 5/455* (2013.01); *G11B 5/3909* (2013.01)

(58) Field of Classification Search
CPC .............................. G11B 5/455; G11B 5/3909
USPC .................................................. 324/210–212
See application file for complete search history.

(56) References Cited

U.S. PATENT DOCUMENTS

| | | | |
|---|---|---|---|
| 4,052,748 A | * | 10/1977 | Kuijk ...................... H01L 43/08 257/E43.004 |
| 6,473,257 B1 | | 10/2002 | Shimazawa et al. |
| 7,372,282 B2 | | 5/2008 | Hachisuka et al. |
| 7,417,442 B2 | | 8/2008 | Hachisuka et al. |
| 8,120,353 B2 | | 2/2012 | Iben |
| 2003/0234646 A1 | * | 12/2003 | Patland ................... G11B 5/455 324/210 |
| 2009/0256557 A1 | * | 10/2009 | Kiyono ................. B82Y 25/00 324/210 |

FOREIGN PATENT DOCUMENTS

| | | |
|---|---|---|
| JP | 2004242189 A | 8/2004 |
| JP | 2005340430 A | 12/2005 |
| JP | 2006060120 A | 3/2006 |
| JP | 2007004857 A | 1/2007 |

* cited by examiner

*Primary Examiner* — Jay Patidar
(74) *Attorney, Agent, or Firm* — Andrew Aubert

(57) ABSTRACT

Embodiments of the present invention provide methods, systems, and computer program products for detecting damage to tunneling magnetoresistance (TMR) sensors. In one embodiment, resistances of a TMR sensor are measured upon application of one or both of negative polarity bias current and positive polarity bias current at a plurality of current magnitudes. Resistances of the TMR sensor can then be analyzed with respect to current, voltage, voltage squared, and/or power, including analyzes of changes to slopes calculated with these values and hysteresis-induced fluctuations, all of which can be used to detect damage to the TMR sensor. The present invention also describes methods to utilize the measured values of neighbor TMR sensors to distinguish normal versus damaged parts for head elements containing multiple TMR read elements.

20 Claims, 16 Drawing Sheets

MEASURING AND ANALYZING ELECTRICAL RESISTANCE IN TUNNELING MAGNETORESIST SENSORS TO IDENTIFY DAMAGED SENSORS

BACKGROUND OF THE INVENTION

The present invention relates generally to the field of data storage systems, and more particularly to detecting damage to tunneling magnetoresistance (TMR) sensors.

In magnetic data storage systems, data is written to and read from magnetic recording media using magnetic transducers. TMR sensors are one type of magnetic transducer that are used in magnetic data storage systems (e.g., hard disk drives). TMR sensors comprise two ferromagnetic layers separated by a thin oxide tunnel barrier (e.g., MgO or AlO). The polarization direction of one of the ferromagnetic layers is "pinned" to a particular direction, while the polarization direction of the other ferromagnetic layer (i.e., the free layer) is free to align with the polarization direction of magnetic storage media over which the TMR sensor is passed. When the polarization directions of the free and pinned layers which straddle the tunnel barrier are parallel, the electrical resistance across the TMR sensor is low because it is more likely that electrons will tunnel through the tunnel barrier; when the polarization directions of the two ferromagnetic layers are antiparallel, the electrical resistance across the TMR sensor is high because it is less likely that electrons will tunnel through the tunnel barrier. Accordingly, TMR sensors can read bits stored on magnetic storage media by measuring changes in resistance across the TMR sensor due to the magnetic fields generated by the bit transitions as the sensor passes over those bits.

Damage to TMR sensors can occur in numerous ways and is often difficult to detect. For example, damage due to dielectric breakdown across the tunnel barrier, pin-holes, and lapping smears can all result in degraded and/or abnormal amplitude response of a TMR sensor. While magnetic tests can often detect the damage by degraded or abnormal magnetoresistance (MR) response from a magnetic field, it can be difficult or impossible to subject the TMR readers to magnetic fields in the manufacturing line.

SUMMARY

Embodiments of the present invention provide methods, systems, and computer program products for detecting damage to tunneling magnetoresistance (TMR) sensors. In one embodiment, resistances of a TMR sensor are measured upon application of one or both of negative polarity current and positive polarity current at a plurality of current magnitudes, wherein the plurality of current magnitudes comprises at least three current magnitudes. A slope and zero-current intercept for the measured resistances of the TMR sensor at the plurality of current magnitudes is calculated, and it is determined whether at least one of the calculated slope and the zero-current intercept are outside of a specified range of values. If at least one of the calculated slope and the zero-current intercept are outside of the specified range of values, the TMR sensor is identified as damaged.

DETAILED DESCRIPTION

Embodiments of the present invention recognize that existing techniques for detecting damage to TMR sensors can be expensive, inefficient, and/or ineffective. For example, detecting dielectric breakdown in a TMR sensor by simply measuring the sensor resistance and comparing to an expected value is not feasible in a manufacturing facility because manufacturing processes of TMRs (e.g., lapping processes that result in stripe height variations) often cause variations in resistance that subsume variations in resistance caused by dielectric breakdown. Similarly, detecting damage to TMR sensors using externally generated magnetic fields can be difficult in a manufacturing line because materials within heads in which TMR sensors are installed can interfere with measured magnetic responses, can be damaged by externally generated magnetic fields from instruments, and can be too expensive or too time consuming to use in the manufacturing process.

Embodiments of the present invention provide efficient, cost-effective systems and methods for detecting damage to TMR sensors using resistance measurements. In one embodiment, a range of bias currents of positive and negative polarities are passed through a TMR sensor. In this document, positive polarity current is defined as the current polarity used during normal operation of the TMR sensor, and negative polarity current is when the current flows in the direction opposite to normal operation of the TMR sensor. The bias current passing through the TMR sensor creates a magnetic field within the TMR sensor that interacts with any defects in the TMR sensor (e.g., dielectric damage, pinholes, lapping smears, magnetic domains, noise). Resistance (R) of the TMR sensor can then be analyzed with respect to current (I), voltage (V), voltage squared ($V^2$), and/or power (P), including analyses of changes to slopes calculated with these values and hysteresis-induced fluctuations, all of which can be used to detect damage to the TMR sensor. The measurements also take into account the normal dependence of the tunneling currents on applied voltage to determine whether or not the parts are functioning within the normal range. The present invention also describes methods to utilize the measured values of neighbor TMRs to significantly improve the ability to distinguish normal versus damaged parts for head elements containing multiple, ostensibly identical TMR read elements. Furthermore, embodiments of the present invention can be used to detect damage to TMR sensors without needing to apply bias currents whose magnitudes exceed normal safe operating ranges of a TMR sensor or otherwise stressing the TMR sensory beyond what would be considered a safe value.

Figure 1:
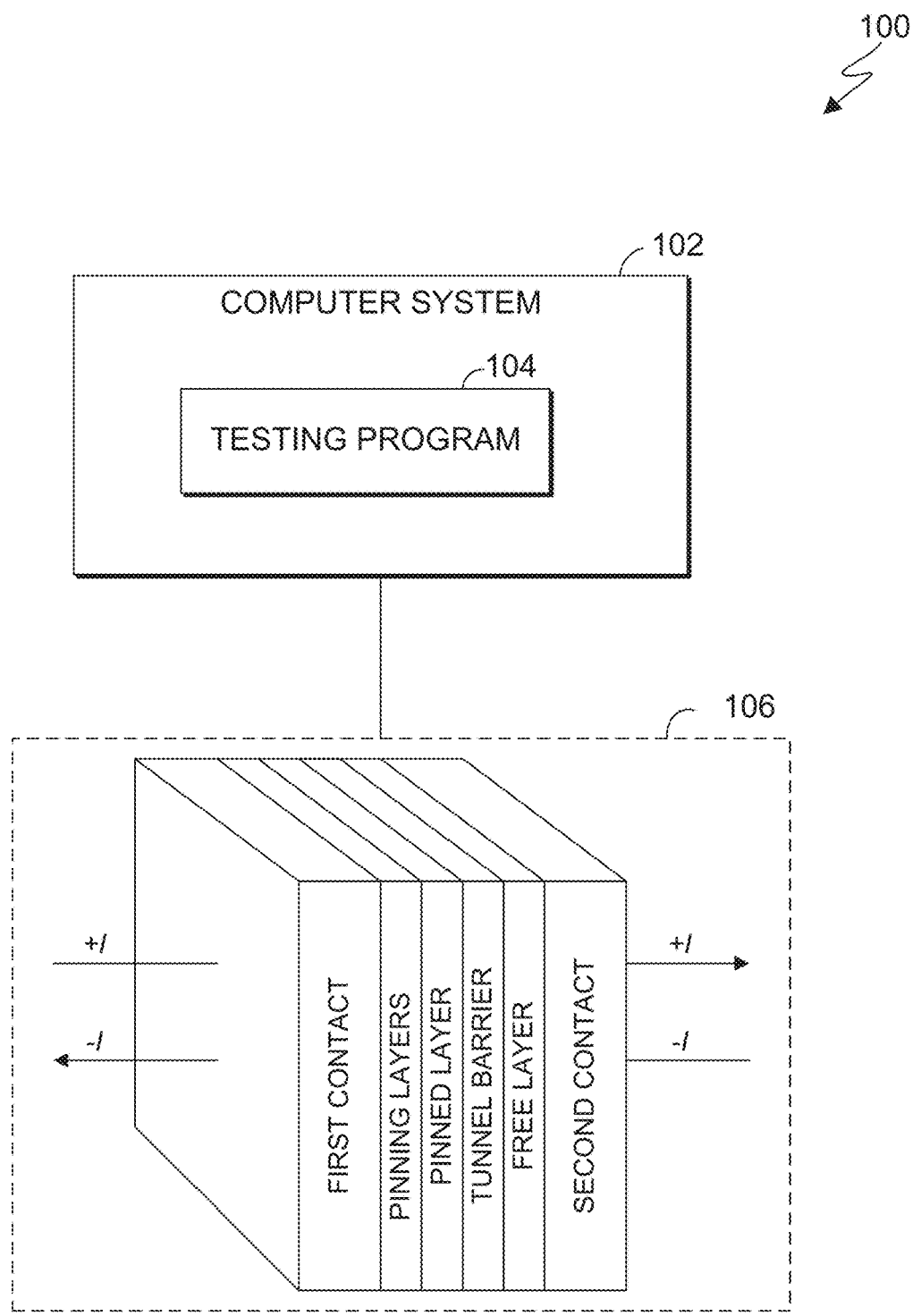
FIG. 1 is a block diagram illustrating an environment, in an embodiment of the present invention.

FIG. 1 is a functional block diagram of an environment 100 in accordance with an embodiment of the present invention. Environment 100 includes computer system 102. Computer system 102 can be a desktop computer, laptop computer, specialized computer server, or any other computer system known in the art. In certain embodiments, computer system 102 represents a computer system utilizing clustered computers and components to act as a single pool of seamless resources when accessed through a network. In general, computer system 102 is representative of any electronic device, or combination of electronic devices, capable of executing machine-readable program instructions, as described in greater detail with regard to FIG. 11.

Computer system 102 includes testing program 104. Testing program 104 performs various testing operations on TMR sensor 106 (and other TMR sensors), to which computer system 102 is operatively coupled (e.g., via one or more wired connections) to detect whether TMR sensor 106 is damaged.

TMR sensor 106 comprises a first contact, pinning layers, pinned layer, tunnel barrier, free layer, and a second contact. As shown in FIG. 1, computer system 102, in conjunction with testing program 104, can pass positive (+I) and negative (−I) polarity bias currents through TMR sensor 106 perpendicular to the plane of the sheet layers and tunnel the tunnel barrier film from the first contact to the second contact and vice versa. References to a current I, as used herein, refers to a magnitude of that current, unless otherwise noted. Currents of positive polarity may be denoted as +I or $I_p$; currents of negative polarity may be denoted as −I or $I_n$. Depending on the orientation of TMR sensor 106, the first and second contacts may be regarded as left and right contacts, right and left contacts, top and bottom contacts, or bottom and top contacts, respectively. As will be understood by those of ordinary skill in the art, FIG. 1 provides a simplified illustration of TMR sensor 106 and is not to be construed as limiting embodiments of the present invention to that which is depicted. For example, the direction of positive or negative currents could be reversed depending on the desires of the designer of TMR sensor 106 and/or a device in which TMR sensor 106 is incorporated. Furthermore, a designer may add more layers or remove layers from TMR sensor 106 depending on usage. TMR sensor 106 can be implemented with any TMR sensor technology known in the art. Similarly, testing program 104 and computer system 102 can be operatively coupled to a plurality of TMR sensors 106. For example, a head or other device may comprise many TMR sensors 106.

Figure 2:
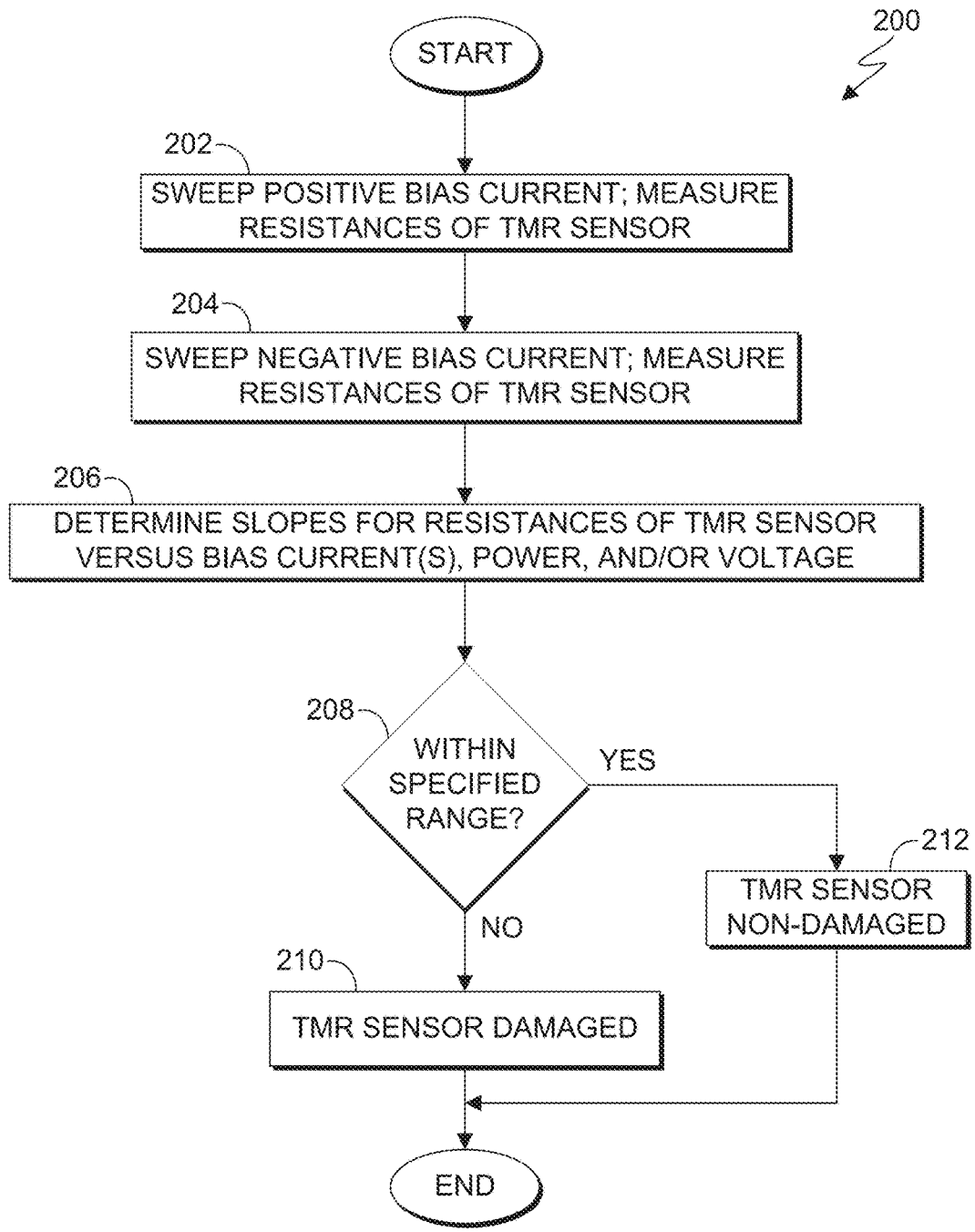
FIG. 2 is a flowchart illustrating operations for determining whether a TMR sensor is damaged, in accordance with an embodiment of the present invention.

FIG. 2 is a flowchart 200 illustrating operations for determining whether TMR sensor 106 is damaged, in accordance with an embodiment of the present invention. The term "damage", as used herein, refers generally to any abnormalities and/or defects in TMR sensor 106 that affect its operation. For example, damage to TMR sensor 106 can include, but is not limited to, magnetic domains, instability, defects, and breakdown of materials of TMR sensor 106.

Testing program 104 sweeps through positive polarity bias currents of different magnitudes, passes the bias currents through TMR sensor 106, and measures resistances (R) of TMR sensor 106 during the application of the bias currents (operation 202). In this embodiment, testing program 104 uses at least three different magnitudes of positive polarity bias current, and all magnitudes of positive polarity bias current used are within the normal safe operating range for TMR sensor 106. In some instances, in sweeping through the bias currents, testing program 104 can step through a plurality of intermediate magnitudes of positive polarity bias current from an initial low value to a high value and then back down to the initial low value. As discussed in greater detail later in this specification, sweeping through different magnitudes of bias currents in this manner can be used to detect the existence of hysteresis loops in TMR resistance versus current resulting from the interaction of magnetic fields generated in TMR sensor 106 in response to application of the bias currents, which can be indicative of magnetic domains and/or other magnetic abnormalities in TMR sensor 106 that can appear in TMR sensor 106 from external magnetic fields.

Testing program 104 sweeps through negative polarity bias currents of different magnitudes, passes the bias currents through TMR sensor 106, and measures resistances (R) of TMR sensor 106 during the application of these bias currents (operation 204). Again, in this embodiment, testing program 104 uses at least three different magnitudes of negative polarity bias current, and all magnitudes of negative polarity bias current used are within the normal safe operating range for TMR sensor 106. In some instances, testing program 104 can step through a plurality of intermediate magnitudes of negative polarity bias current from an initial low value to a high value and then back down to the initial low value, as previously discussed.

Testing program 104 determines slopes and zero-current intercepts for the measured resistances of TMR sensor 106 versus the applied bias currents (I), power (P), and/or voltage (V) taken at positive and/or negative polarity (operation 206). In this embodiment, to determine the slopes and zero-current intercepts for the measured resistances of TMR sensor 106 versus the applied bias currents ("Bias Current Slopes"), testing program 104 uses a best fit method to find a best linear fit according to the following formulas:

$$R_p(I_p) = R_{po} + dRdI_p * I_p \quad \text{Formula 1}$$

where $R_p(I_p)$ is measured resistance $R_p$ of TMR sensor 106 upon application of positive polarity bias current of magnitude $I_p$; $R_{po}$ is the zero-current intercept; $dRdI_p$ is the slope of the measured resistance $R_p$ versus positive polarity bias current of magnitude $I_p$; and $I_p$ is the magnitude of the positive polarity bias current (i.e., subscript "p" indicates positive polarity and $I_p$ is the current magnitude).

$$R_n(I_n) = R_{no} + dRdI_n * I_n \quad \text{Formula 2}$$

where $R_n(I_n)$ is measured resistance $R_n$ of TMR sensor 106 upon application of negative polarity bias current of magnitude $I_n$; $R_{no}$ is the zero-current intercept; $dRdI_n$ is the slope of the measured resistance $R_n$ versus negative bias current of magnitude $I_n$; and $I_n$ is the magnitude of the negative polarity bias current (i.e., subscript "n" indicates negative polarity and $I_n$ is the current magnitude). In the context of TMR sensors, current is passed perpendicular to the layers of the TMR sensor (see, e.g., FIG. 1). In giant magnetoresistance (GMR) sensors, the magnetic field is in the plane of the free layer and rotates it essentially uniformly and in opposite directions for positive and negative polarity currents. Thus, the effect of the magnetic field can be ascertained by taking the difference in the resistance at a positive polarity current versus a negative polarity current of the same magnitudes. For TMR sensors, the field generated in the free layer is in a loop (i.e., up on one side and down on the other). For a normal sensor, the effect of the current-generated magnetic field on the TMR response should be zero and independent of current polarity. Thus, $R_n(I_n)$ and/or $R_p(I_p)$ may be analyzed individually. It has been discovered that, in some instances, the currents generated within TMR sensors will interact with the TMR sensor is such a manner as to affect the $R_n(I_n)$ measurements, and that analyzing the $R_n(I_n)$ may reveal damage in TMR sensor 106 where $R_p(I_p)$ measurements would otherwise indicate no damage is present and vice versa, as discussed in greater detail later in this specification.

To determine the slopes and zero-current intercepts for the measured resistances of TMR sensor 106 versus the power ("Power Slopes"), testing program 104 calculates power in TMR sensor 106. Upon application of positive polarity bias currents of magnitude $I_p$, the power $P_p$ of TMR sensor 106 for measured resistance $R_p$ of TMR sensor 106 (i.e., $P_p(I_p, R_p(I_p))$) can be calculated as:

$$P_p(I_p, R_p(I_p)) = R_p(I_p) * [I_p]^2 \quad \text{Formula 3}$$

Upon application of negative polarity bias currents of magnitude $I_n$, the power $P_n$ of TMR sensor 106 for measured resistance $R_n$ of TMR sensor 106 (i.e., $P_n(I_n, R_n(I_n))$) can be calculated as:

$$P_n(I_n, R_n(I_n)) = R_n(I_n) * [I_n]^2 \quad \text{Formula 4}$$

Testing program 104 then uses a best fit method to find a best linear fit according to the following formulas:

$$R_p(I_p) = R_{po} + dRdP_p * P_p \quad \text{Formula 5}$$

where $R_p(I_p)$ is measured resistance $R_p$ of TMR sensor 106 upon application of positive polarity bias current of magnitude $I_p$; $R_{po}$ is the zero-current intercept; and $dRdP_p$ is the slope of the measured resistance $R_p$ versus power $P_p$ for positive polarity bias current; and $P_p$ is the power for positive polarity bias current calculated using Formula 3.

$$R_n(I_n) = R_{no} + dRdP_n * P_n \quad \text{Formula 6}$$

where $R_n(I_n)$ is measured resistance $R_n$ of TMR sensor 106 upon application of negative polarity bias current of magnitude $I_n$; $R_{no}$ is the zero-current intercept; and $dRdP_n$ is the slope of the measured resistance $R_n$ versus power $P_n$ for negative polarity bias current; and $P_n$ is the power for negative polarity bias current calculated using Formula 4.

To determine the slopes and zero-current intercepts for the measured resistances of TMR sensor 106 versus the voltage ("Voltage Slopes"), testing program 104 calculates voltage in TMR sensor 106 using the following formulas:

$$V_p(I_p) = [R_p(I_p) - R_{wire}] * I_p \quad \text{Formula 7}$$

where $V_p(I_p)$ is voltage $V_p$ of TMR sensor 106 for positive polarity bias current of magnitude $I_p$; $R_p(I_p)$ is resistance $R_p$ of TMR sensor 106 upon application of positive polarity bias current of magnitude $I_p$; $R_{wire}$ represents any wire resistances; and $I_p$ is the magnitude of the positive polarity bias current.

$$V_n(I_n)=[R_n(I_n)-R_{wire}]*I_n \quad \text{Formula 8}$$

where $V_n(I_n)$ is voltage $V_n$ of TMR sensor 106 for negative polarity bias current of magnitude $I_n$; $R_n(I_n)$ is resistance $R_n$ of TMR sensor 106 upon application of negative polarity bias current of magnitude $I_n$; $R_{wire}$ represents any wire resistances, which may include wires external to the deposited metals and may also include any metal wires within the device itself leading to the tunnel barrier; and $I_n$ is the magnitude of the negative polarity bias current.

Testing program 104 then uses a best fit method to find a best linear fit according to the following formulas:

$$R_p(I_p)=R_{po}+dRdV_p*V_p(I_p) \quad \text{Formula 9}$$

where $R_p(I_p)$ is measured resistance $R_p$ of TMR sensor 106 upon application of positive polarity bias current of magnitude $I_p$; $R_{po}$ is the zero-current intercept; $dRdV_p$ is the slope of the measured resistance $R_p$ versus voltage $V_p$ for positive polarity bias current; and $V_p(I_p)$ is voltage $V_p$ of TMR sensor 106 upon application of positive polarity bias current of magnitude $I_p$, as calculated using Formula 7.

$$R_n(I_n)=R_{no}+dRdV_n*V_n(I_n) \quad \text{Formula 10}$$

where $R_n(I_n)$ is measured resistance $R_n$ of TMR sensor 106 upon application of negative polarity bias current of magnitude $I_n$; $R_{no}$ is the zero-current intercept; $dRdV_n$ is the slope of the measured resistance $R_n$ versus voltage $V_n$ for negative polarity bias current; and $V_n(I_n)$ is voltage $V_n$ of TMR sensor 106 upon application of negative polarity bias current of magnitude $I_n$, as calculated using Formula 8.

Testing program 104 determines whether the slopes and/or zero-current intercepts calculated in operation 206 are within a specified range (operation 208). It has been found that slopes for current, voltage, and power have a strong correlation with magnetic amplitude within TMR sensor 106, and that slopes that fall out of certain ranges can be indicative of damage to TMR sensor 106. It has also been found that low current resistance (as well as zero-current intercepts for resistance versus current, voltage, or power) has a strong correlation with magnetic amplitude within TMR sensor 106 and that resistances which fall out of certain ranges can be indicative of damage to TMR sensor 106. Accordingly, in this embodiment, a user can specify a range of slopes and/or y-intercepts (i.e., zero-current intercepts), outside of which TMR sensor 106 should be regarded as being damaged. Such specified slopes and y-intercepts can be theoretically and/or experimentally determined. For example, as discussed in greater detail later in this specification, specified ranges of slopes and y-intercepts can be based on those obtained for TMR sensors that are known to be non-damaged and/or a plurality of TMR sensors within the same device as TMR sensor 106. In one embodiment, the specified range of slopes and/or y-intercepts can be expressed as a maximum allowable percentage difference from slopes and/or y-intercepts for one or more TMR sensors that are known to be non-damaged. In another embodiment, the specified range of slopes and/or y-intercepts can be expressed as a maximum allowable deviation from slopes and/or y-intercepts of one or more TMR sensors that are not necessarily known to be non-damaged, but that are similar TMR sensors (e.g., produced on the same production line, contained with the same multi-sensor device, etc.). In one embodiment, testing program 104 compares measured resistance values and slopes for different current, voltage, and/or power values to statistically determined mean and/or median values for self-similar parts, such as other TMR sensors 106 from the same production batch, or other TMR sensors 106 within the same multi-sensor device, where TMR sensor 106 is regarded as being damaged if the variation exceeds the mean or median values. For example, one way of checking TMR sensor 106 for damage is to compare the parameter in question (e.g., $dRdV_n$) with the statistical value measured for other TMR sensors 106 with the same resistance value measured at low current/voltage, such as $R_n(-I_o)$, $R_p(+I_o)$ or $[R_n(-I_o)+R_p(+I_o)]/2$, where $I_o$ is a fixed value, such as the lowest operating current or even lower (e.g., if the operating range of $I_p$ is 1 to 6 mA, then $I_o<=1$ mA). A user can also analyze mean values for a plurality of TMR sensors 106 and calculate a standard deviation, beyond which a TMR sensor 106 is regarded as being damaged.

If testing program 104 determines that the slope(s) are not within the specified range of acceptable values, then testing program 104 indicates that TMR sensor 106 is damaged (operation 210). For example, testing program 104 may provide an aural and/or visual notification to a user operating computer system 102.

If testing program 104 determines that the slope(s) are within the specified range of acceptable values, then testing program 104 indicates that TMR sensor 106 is non-damaged (operation 212). Again, for example, testing program 104 may provide an aural and/or visual notification to the user operating computer system 102.

Figure 3:
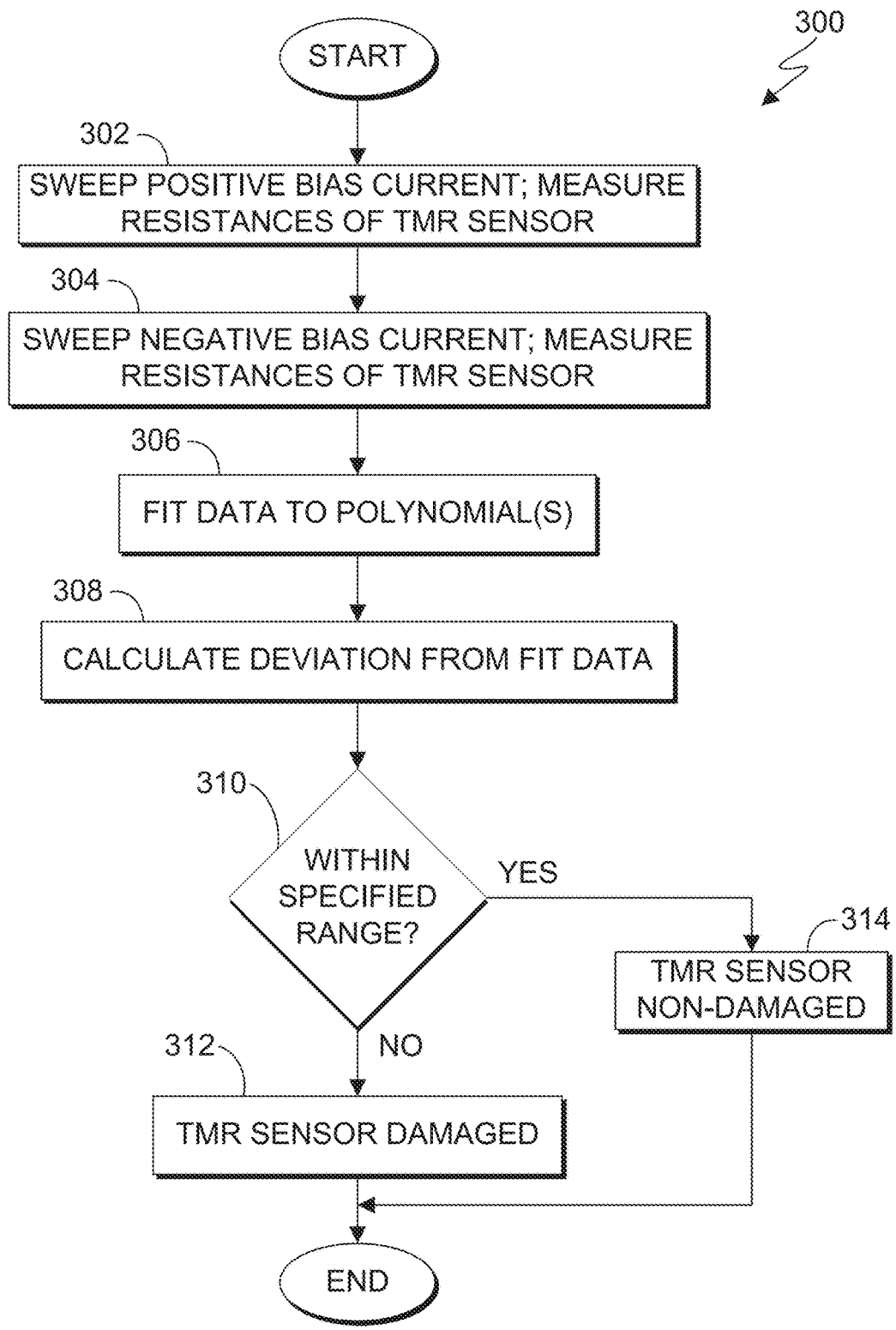
FIG. 3 is a flowchart illustrating operations for determining whether a TMR sensor is damaged, in accordance with another embodiment of the present invention.

FIG. 3 is a flowchart 300 illustrating operations for determining whether a TMR sensor is damaged, in accordance with another embodiment of the present invention. In this embodiment, testing program 104 sweeps through positive polarity bias currents of different magnitudes, passes the bias currents through TMR sensor 106, and measures resistances (R) of TMR sensor 106 during the application of the bias currents (operation 302), as previously discussed with regard to operation 202 of FIG. 2. Similarly, testing program 104 sweeps through negative polarity bias currents of different magnitudes, passes the bias currents through TMR sensor 106, and measures resistances (R) of TMR sensor 106 during the application of these bias currents (operation 304), as previously discussed with regard to operation 204 of FIG. 2. In some instances, testing program 104 can step through a plurality of different magnitudes of positive and negative polarity bias current from an initial low value to a high value and then back down to the initial low value, as previously discussed.

Testing program 104 fits data of TMR sensor 106 to one or more polynomials (operation 306). In this embodiment, the data used by testing program 104 can include measured resistances (R) of TMR sensor 106 at positive and negative polarity bias currents (i.e., $R_p(I_p)$ and $R_n(I_n)$), corresponding voltages (i.e., $R_p(V_p)$ and $R_n(V_n)$), and/or corresponding power (i.e., $R_p(P_p)$ and $R_n(P_n)$), as discussed with regard to FIG. 2.

Testing program 104 can fit the data of TMR sensor 106 to any desired polynomial. In one embodiment, testing program 104 fits the data to a linear polynomial according to the following formula:

$$R(x)_{fit}=a_0+[a_1*x] \quad \text{Formula 11}$$

where x is bias current, voltage, or power for either positive or negative polarity (i.e., $R_p(I_p)_{fit}$, $R_n(I_n)_{fit}$, $R_p(V_p)_{fit}$, $R_n(V_n)_{fit}$, $R_n(P_p)_{fit}$, or $R_n(P_n)_{fit}$), and testing program 104 finds values for $a_0$ and $a_1$ that yield the best fit.

In another embodiment, testing program 104 fits the data to a quadratic polynomial according to the following formula:

$$R(x)_{fit}=a_0+[a_1*x]+[a_2*x^2]] \quad \text{Formula 12}$$

where x is bias current, voltage, or power for either positive or negative polarity (i.e., $R_p(I_p)_{fit}$, $R_n(I_n)_{fit}$, $R_p(V_p)_{fit}$, $R_p(V_p)_{fit}$, $R_n(V_n)_{fit}$, $R_n(P_p)_{fit}$, or $R_n(P_n)_{fit}$), and testing program 104 finds values for $a_0$, $a_1$, and $a_2$ that yield the best fit.

Testing program 104 calculates deviation of measured data from the fit data calculated in operation 306 (operation 308). For example, testing program 104 can calculate deviation of $R_p(I_p)$ from $R_p(I_p)_{fit}$, $R_n(I_n)$ from $R_n(I_n)_{fit}$, $R_p(V_p)$ from $R_p(V_p)_{fit}$, $R_n(V_n)$ from $R_n(V_n)_{fit}$, $R_p(P_p)$ from $R_p(P_p)_{fit}$, and/or $R_n(P_n)$ from $R_n(P_n)_{fit}$. Adherence of measured data to the fit data can also be regarded as the "smoothness" of the polynomial fit when plotted. Similarly, deviation of measured data from the polynomial fit can appear as kinks and/or other non-smooth portions of the polynomial fit when plotted.

An error function can also be defined for the difference between the measured data and the polynomial fitting function of order k (e.g., k=1 or 2 for linear or quadratic, respectively):

$$P_{error_{kp}}(\{R_p(I_j)\}) = \frac{\sum_{j=1:M}\left[R_p(I_j) - \sum_{q=0:k} a_q * x^q\right]^{\wedge}2}{M} \quad \text{Formula 13}$$

and $$P_{error_{kn}}(\{R_n(I_j)\}) = \frac{\sum_{j=1:M}\left[R_n(I_j) - \sum_{q=0:k} a_q * x^q\right]^{\wedge}2}{M} \quad \text{Formula 14}$$

where M is the number of currents for which the currents are measured for each polarity.

Testing program 104 can further analyze calculated deviations of measured data from the fit data to identify variations affected by hysteresis loops. In this embodiment, in sweeping through bias currents, testing program 104 can step through a plurality of different magnitudes of positive and negative polarity bias current from an initial low value to a high value and then back down to the initial low value (e.g., $I_1$, $I_2$, $I_3$, $I_4$, $I_3$, $I_2$, $I_1$) (or from an initial high value to a low value and then back up to the initial high value). Accordingly, testing program 104 can measure resistances of TMR sensor 106 at least twice for the same bias current magnitude values. In one case (i.e., sweeping up from low to high), each bias current magnitude value (e.g., $I_2$) is arrived at by stepping up from a lower bias current magnitude value (e.g., from $I_1$ to $I_2$). In the other case (i.e., sweeping down from high to low), each bias current magnitude value is arrived at by stepping down from a higher bias current magnitude value (e.g., from $I_3$ to $I_2$). The extent to which the measured resistances for a given current magnitude differ from each other can, therefore, be indicative of hysteresis-induced magnetic fluctuations and damage in TMR sensor 106. This difference can be expressed as:

$$D(I_j)=|R(I_{ju})-R(I_{jd})| \quad \text{Formula 15}$$

where $R(I_{ju})$ is the measured resistance of TMR sensor 106 at a particular current magnitude value $I_{ju}$, arrived at by stepping up from a lower bias current magnitude value, and $R(I_{jd})$ is the measured resistance of TMR sensor 106 at the current magnitude value $I_{jd}$, which is the same current magnitude value as $I_{ju}$ but is arrived at by stepping down from a higher bias current magnitude.

Testing program 104 can further quantify differences in measured resistances for each current magnitude swept in operations 302 and 304 in a variety of ways. In one embodiment, testing program 104 identifies the current magnitude at which two measured resistances $R(I_{ju})$ and $R(I_{jd})$ differ the most, and identifies that difference as Fmax (i.e., a maximum difference). Mathematically, Fmax is given by:

$$Fmax=maximum(\{D(I_j)\}) \quad \text{Formula 16}$$

In another embodiment, testing program 104 calculates the average of $\{D(I_j)\}$ for all swept current magnitudes using the following formula:

$$Favg = \sum_{j=1:N} \frac{D(I_j)}{N} \quad \text{Formula 17}$$

where N is the number of bias current magnitudes at which resistance of TMR sensor 106 was measured.

In another embodiment, testing program 104 calculates a square of the average of the calculated differences (i.e., $D(I_j)$) for all swept current magnitudes using the following formula:

$$Fsqr = \sum_{j=1:N} \frac{D(I_j)^2}{N} \quad \text{Formula 18}$$

where N is the number of bias current magnitudes at which resistance of TMR sensor 106 was measured.

Testing program 104 determines whether deviations and/or quantified differences calculated in operation 308 are within a specified range (operation 310). It has been found that deviations of certain magnitudes (and resulting kinks and/or other non-smooth portions of polynomial fits) can be indicative of damage to TMR sensor 106. Accordingly, in this embodiment, a user can specify a range of acceptable deviation from the fit data (i.e., an acceptable amount of non-smoothness) outside of which TMR sensor 106 should be regarded as being damaged. Such specified ranges can be theoretically and/or experimentally determined, as discussed in greater detail later in this specification. Where the bias current is swept up and down, as previously discussed, a user can also specify a range pertaining the extent to which the measured resistances for each current magnitude differ from each other. For example, a user can specify a range of acceptable Fmax, Favg, and/or Fsqr values, outside of which TMR sensor 106 should be regarded as being damaged. A user can also specify a range of acceptable differences between Fmax, Favg, and/or Fsqr values calculated for a plurality of TMR sensors 106. For example, calculated Fmax, Favg, and/or Fsqr values for a first TMR sensor 106 can be compared to those calculated for one or more other TMR sensors from the same production batch, or from within the same multi-sensor device, where the first TMR sensor 106 is regarded as being damaged if the difference between the compared Fmax, Favg, and/or Fsqr values exceeds a specified amount.

If testing program 104 determines that deviations and/or quantified differences calculated in operation 308 are not within the specified range, then testing program 104 indicates that TMR sensor 106 is damaged (operation 312). For example, testing program 104 may provide an aural and/or visual notification to a user operating computer system 102.

If testing program 104 determines that deviations and/or quantified differences calculated in operation 308 are within the specified range, then testing program indicates that TMR sensor 106 is non-damaged (operation 314). Again, testing program 104 may provide an aural and/or visual notification to a user operating computer system 102.

Figure 4:
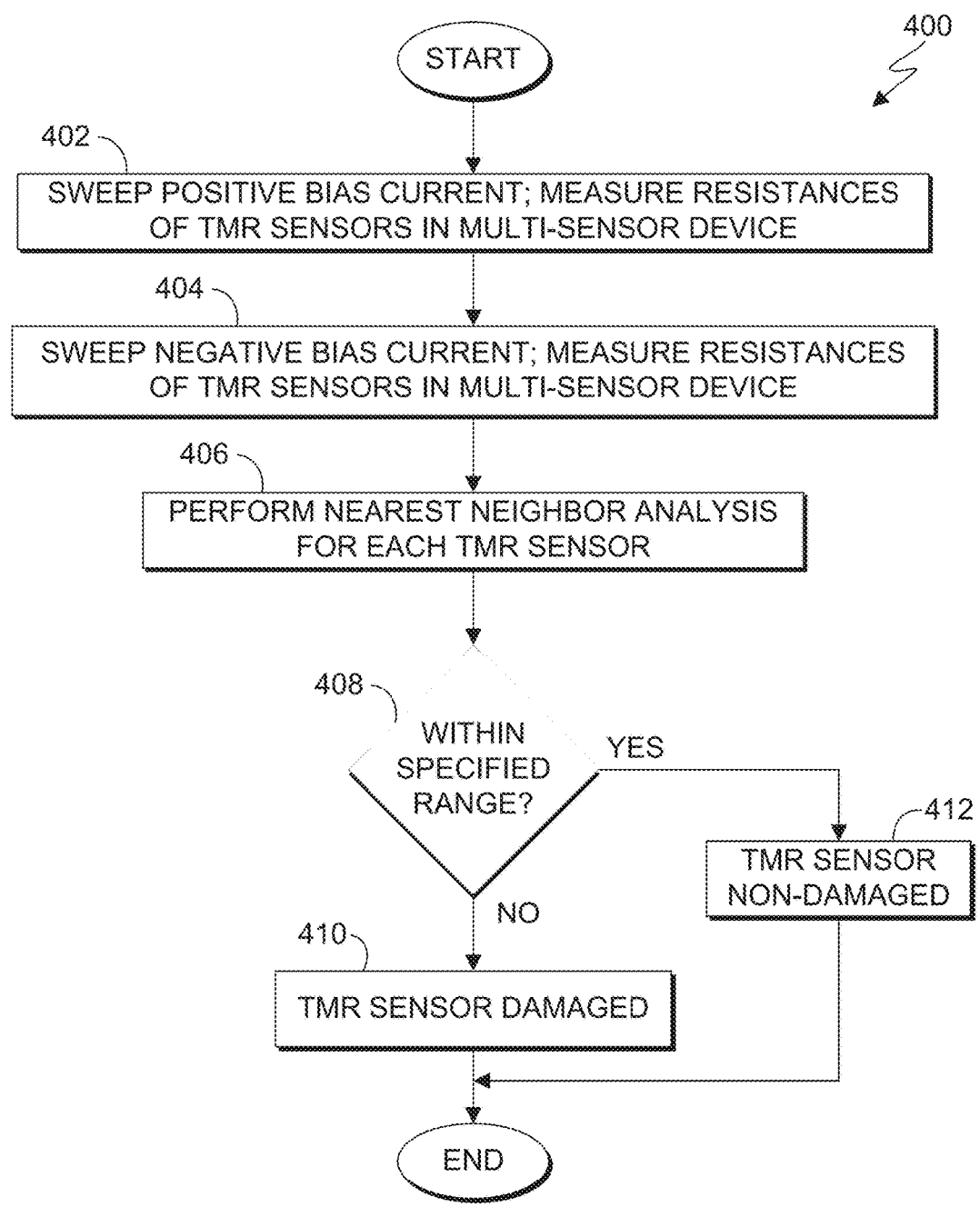
FIG. 4 is a flowchart illustrating operations for determining whether a TMR sensor is damaged, in accordance with another embodiment of the present invention.

FIG. 4 is a flowchart illustrating operations for determining whether a TMR sensor is damaged, in accordance with another embodiment of the present invention. In this embodiment, operations of FIG. 4 are performed to determine whether one or more of a plurality of TMR sensors 106 in a multi-sensor device (e.g., a head) are damaged. For illustrative purposes, the following discussion will be made with respect a multi-sensor device having ten TMR sensors 106; however, it should be understood that embodiments of the present invention can practiced with multi-sensor devices can have a greater or lesser number of TMR sensors 106.

Testing program 104 sweeps through positive polarity bias currents of different magnitudes, passes the bias currents through each of a plurality of TMR sensors 106, and measures resistances (R) of each of the plurality of TMR sensors 106 during the application of the bias currents (operation 402). Similarly, testing program 104 sweeps through negative polarity bias currents of different magnitudes, passes the bias currents through each of the plurality of TMR sensors 106, and measures resistances (R) of each of the plurality of TMR sensors 106 during the application of the negative bias currents (operation 404).

Testing program 104 performs a nearest neighbor analysis for each of the plurality of TMR sensors 106 (operation 406). The phrase "nearest neighbor analysis", as used herein, refers to processes in which measured data for each TMR sensor 106 (e.g., resistance, voltage, power, etc.) in a multi-sensor device is analyzed with respect to the measured data of one or more other TMR sensors 106 that are physically nearest to that TMR sensor 106 within the multi-sensor device. For example, the multi-sensor device (e.g., head) may have ten TMR sensors 106 arranged in a linear, side-by-side fashion, and the nearest neighbors of each TMR sensor 106 can be regarded as the adjacent TMR sensors 106 to the left and/or right in the linear arrangement.

In this embodiment, testing program 104 performs the nearest neighbor analysis by comparing measured resistances for a particular TMR sensor 106 with measured resistances of each TMR sensor 106 that is adjacent to that particular TMR sensor 106 in a linear arrangement within the multi-sensor device. TMR sensors 106 disposed at the ends of the linear arrangement are compared with the two nearest TMR sensors 106 to the left or right of the end TMR sensor 106, respectively. For example, for a multi-sensor device having ten TMR sensors 106 in a linear arrangement S1-S2-S3-S4-S5-S6-S7-S8-S9-S10, measured resistances of S1 are compared with those of S2 and S3; measured resistances of S2 are compared with those of S1 and S3; measured resistances of S3 are compared with those of S2 and S4; measured resistances of S4 are compared with those of S3 and S5; measured resistances of S5 are compared with those of S4 and S6; measured resistances of S6 are compared with those of S5 and S7; measured resistances of S7 are compared with those of S6 and S8; measured resistances of S8 are compared with those of S7 and S9; measured resistances of S9 are compared with those of S8 and S10; and measured resistances of S10 are compared with those of S8 and S9. The nearest neighbor analysis can also be used for any measured and/or calculated value. For example, slopes $dRdI_n$, $dRdI_p$, $dRdV_n$, $dRdV_p$, $dRdP_n$, and $dRdP_p$, as well as the y-intercepts for the polynomial fits and/or deviations of data from the polynomial fits for TMR sensors 106 can be compared those of other TMR sensors 106.

Testing program 104 identifies whether the extent to which measured resistances of one or more TMR sensors 106 differ from those of its neighbors are within a specified range (operation 408). It has been found that differences in resistances (or other measured data) between neighboring TMR sensors 106 in a multi-sensor device can be indicative of damage to one or more of those TMR sensors 106. Furthermore, by comparing measured data of TMR sensors 106 with that of other TMR sensors 106 within close proximity of each other within the multi-sensor device, variations in such data are more likely to be the result of damage to TMR sensors 106, rather than operating conditions, external factors, and/or other factors that are common to multiple TMR sensors (i.e., self-similar parts) within the device. Accordingly, in this embodiment, a user can specify a range of acceptable differences, outside of which that TMR sensor 106 should be regarded as being damaged. Such specified ranges can be theoretically and/or experimentally determined.

If testing program 104 determines that the extent to which measured resistances of one or more TMR sensors 106 differ from those of its neighbors are not within the specified range, then testing program 104 indicates that TMR sensor 106 is damaged (operation 410). For example, testing program 104 may provide an aural and/or visual notification to a user operating computer system 102.

If testing program 104 determines that the extent to which measured resistances of one or more TMR sensors 106 differ from those of its neighbors are within the specified range, then testing program indicates that TMR sensor 106 is non-damaged (operation 412). Again, testing program 104 may provide an aural and/or visual notification to a user operating computer system 102.

Figure 5A:
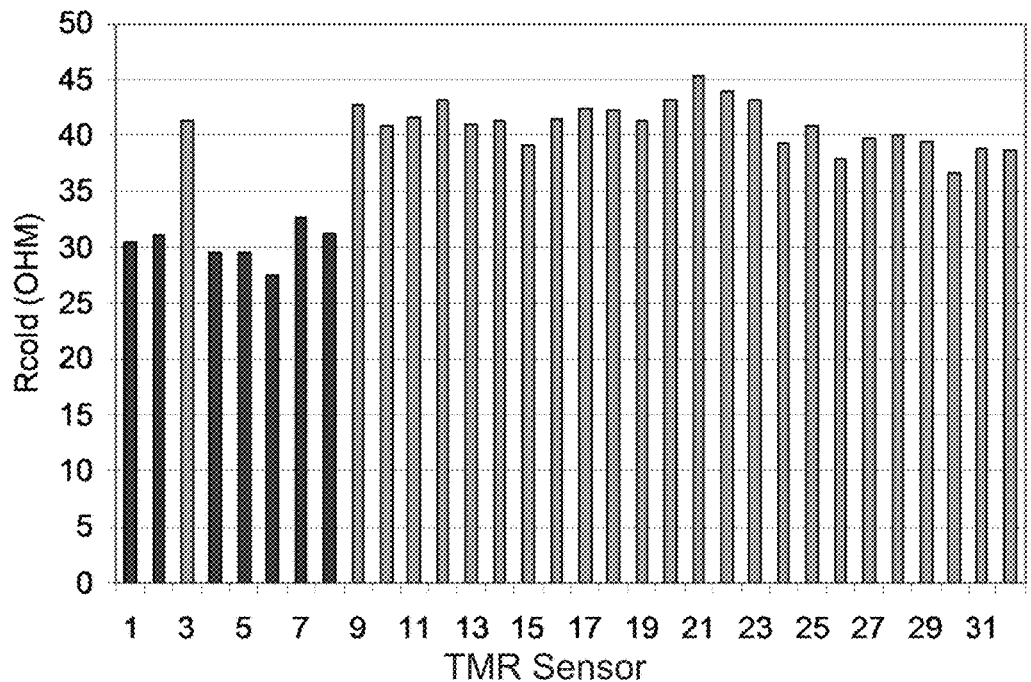
FIG. 5A is an example plot of resistance versus TMR number for a plurality of TMR sensors, in accordance with an embodiment of the present invention.

FIG. 5A is an example plot of resistance (at low current, Rcold) versus TMR number for a plurality of TMR sensors, in accordance with an embodiment of the present invention. In this example, the resistance of thirty two TMR sensors in a same wafer chip was measured without applying a bias current. TMR sensors 1, 2, and 4-8 (depicted in a darker shade) were previously subjected to electrical overstress (EOS) and electrostatic discharge (ESD) pulses and suffered dielectric breakdown. As shown, this damage resulted in decreased resistance for TMR sensors 1, 2, and 4-8.

Figure 5B:
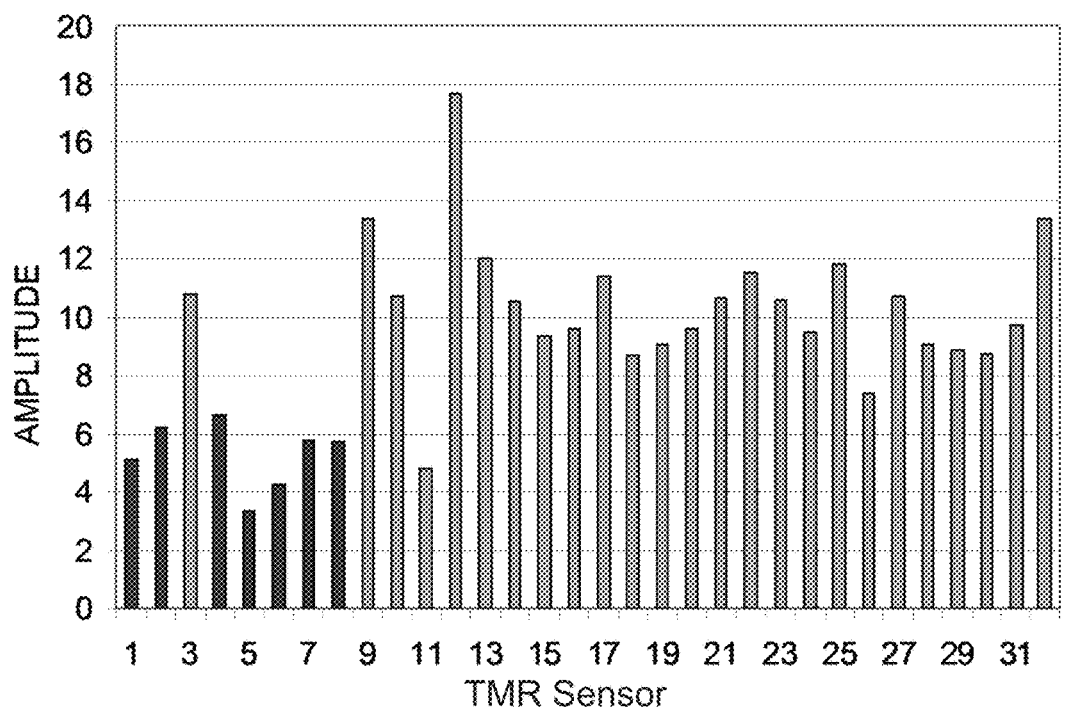
FIG. 5B is an example plot of amplitude versus TMR number for the plurality of TMR sensors of FIG. 5A, in accordance with an embodiment of the present invention.

FIG. 5B is an example plot of amplitude versus TMR number for the plurality of TMR sensors of FIG. 5A, in accordance with an embodiment of the present invention. As shown, the damage to TMR sensors 1, 2, and 4-8 (depicted in a darker shade) also resulted in decreased amplitude.

Figure 5C:
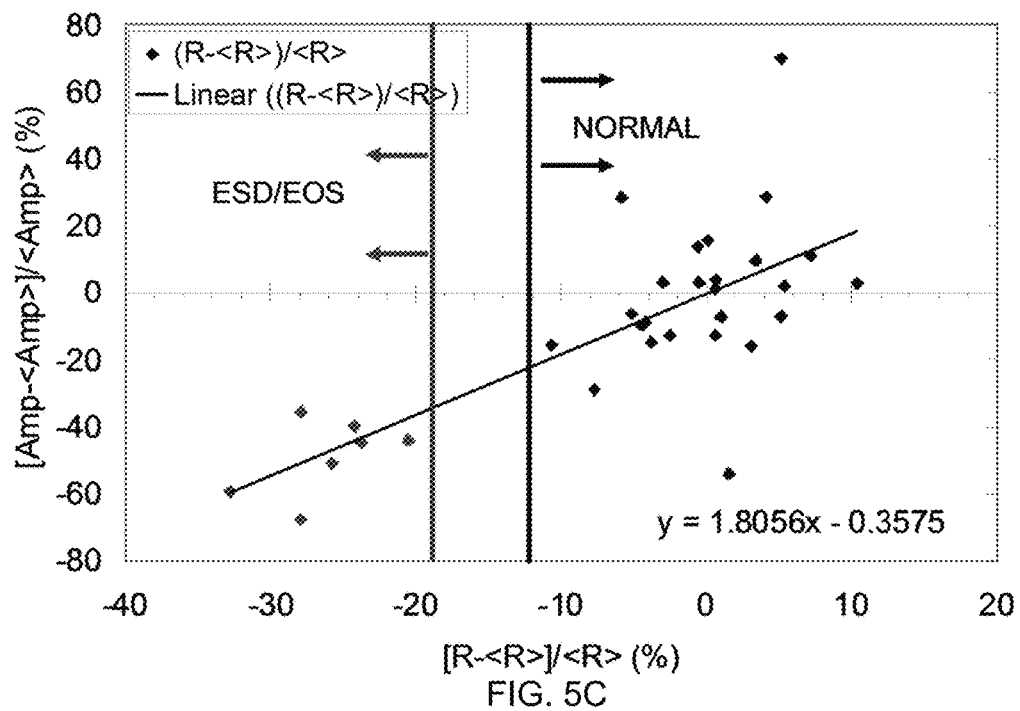
FIG. 5C is an example plot of percentage change from average amplitude versus percentage change from average resistance for the plurality of TMR sensors of FIG. 5A, in accordance with an embodiment of the present invention.

FIG. 5C is an example plot of percentage change in amplitude from the average amplitude for non-damaged TMR sensors of the plurality of TMR sensors of FIG. 5A (i.e., self-similar parts) versus percentage change in resistance from the average resistance of non-damaged TMR sensors of the plurality of TMR sensors of FIG. 5A, in accordance with an embodiment of the present invention. As shown, the values for damaged TMR sensors 1, 2, and 4-8 (data points depicted in a lighter shade) form a well-defined group left of the ESD/EOS line, while values for non-damaged TMR sensors 3 and 9-32 (data points depicted in a darker shade in FIG. 5C) form a well-defined group right of the NORMAL line. FIG. 5C also shows the data fit to a linear polynomial having the formula: $y=-0.0525x+0.0235$. That is, the calculated y-intercept for this data is 0.0235 and the slope is $-0.0525$. Accordingly, the correlations shown in FIGS. 5A-5C can be used to identify TMR sensors 1, 2, and 4-8 as damaged, without requiring preexisting knowledge of resistance values for TMR sensors that are known to be non-damaged. For example, a user can specify that all TMR sensors that have greater than a −20% change from the average resistance should be regarded as damaged. Many other statistical techniques can be used to identify outliers from a normal distribution. One such example is discussed with regard to FIG. 9A.

Figure 6A:
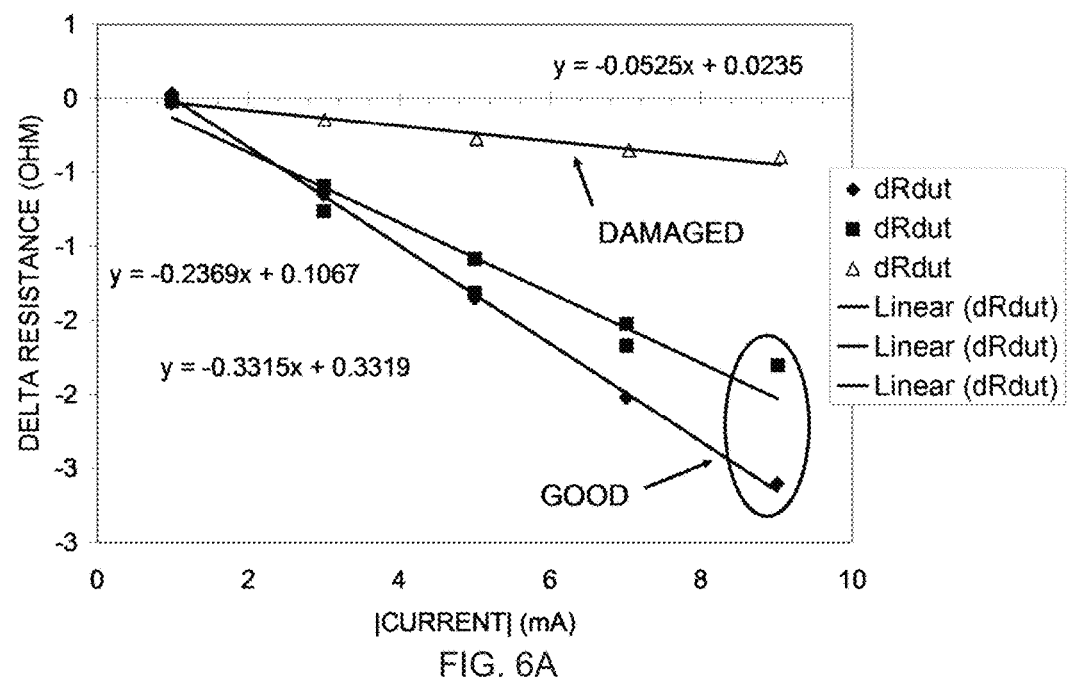
FIG. 6A is an example plot of the difference in resistance from the resistance at 1 mA versus magnitude of negative polarity bias current for two non-damaged TMR sensors and one damaged TMR sensor of the plurality of TMR sensors of FIG. 5A, in accordance with an embodiment of the present invention.

FIG. 6A is an example plot of the difference in resistance from the resistance at 1 mA (Rcold) (i.e., delta resistance) versus magnitude of negative polarity bias current for non-damaged TMR sensors 3 and 9 and damaged TMR sensor 1 of FIG. 5A, in accordance with an embodiment of the present invention. As shown, the y-intercept for damaged TMR sensor 1 varies significantly from those of the non-damaged TMR sensors 3 and 9 (i.e., 0.0235 as compared to 0.1067 and 0.3319, respectively). Similarly, the slope for damaged TMR sensor 1 varies significantly from those of non-damaged TMR sensors 3 and 9 (i.e., −0.0525 as compared to −0.2369 and −0.3315, respectively).

Figure 6B:
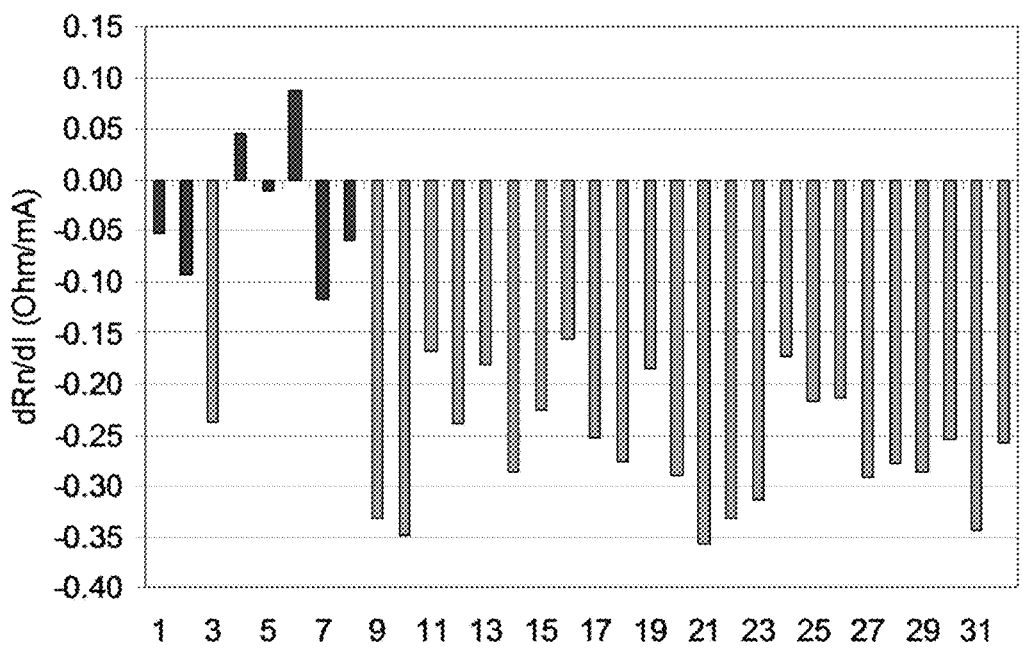
FIG. 6B is an example plot of the slope of resistance versus magnitude of negative polarity bias current for the plurality of damaged and non-damaged TMR sensors of FIG. 5A, in accordance with an embodiment of the present invention.

FIG. 6B is an example plot of the slope of resistance versus magnitude of negative polarity bias current for the plurality of damaged and non-damaged TMR sensors of FIG. 5A, in accordance with an embodiment of the present invention. As shown, the magnitudes of the slopes (i.e., |dRn/dI|) for damaged TMR sensors 1, 2, and 4-8 (depicted in a darker shade) are significantly less than those of the non-damaged TMR sensors and, in some cases, the sign of $dR_n/dI$ has become positive (clearly damaged).

Figure 6C:
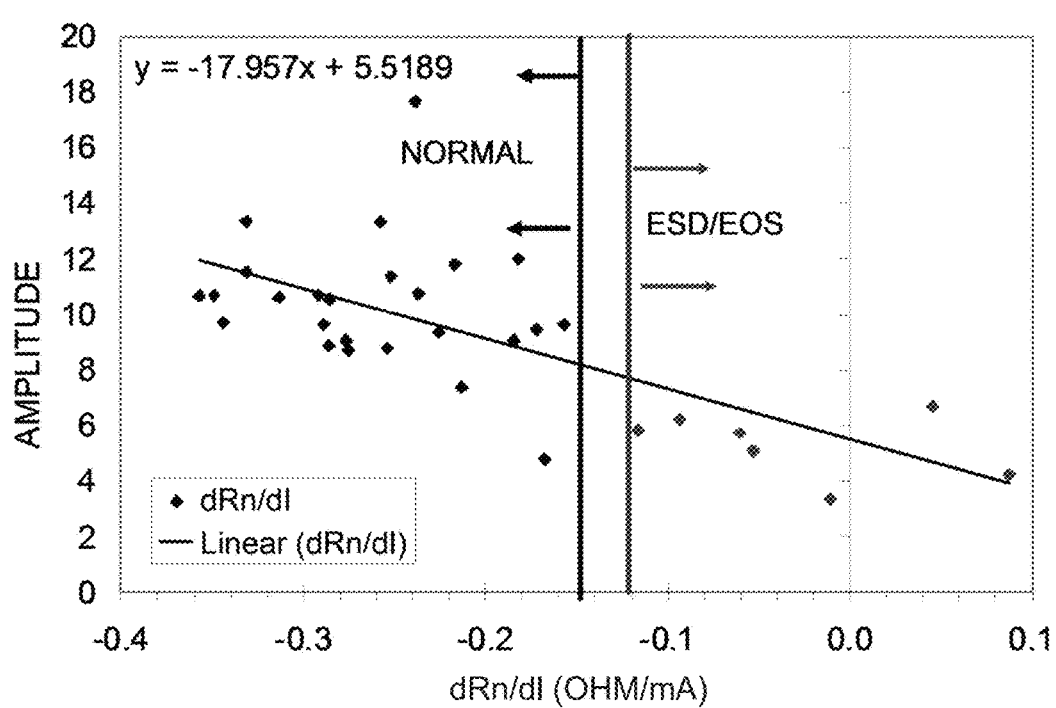
FIG. 6C is an example plot of amplitude versus the slope of resistance versus negative polarity bias current for the plurality of damaged and non-damaged TMR sensors of FIG. 5A, in accordance with an embodiment of the present invention.

FIG. 6C is an example plot of amplitude versus the slope of resistance versus magnitude of negative polarity bias current for the plurality of damaged and non-damaged TMR sensors of FIG. 5A, in accordance with an embodiment of the present invention. As shown, values for damaged TMR sensors 1, 2, and 4-8 (data points depicted in a lighter shade) form a well-defined group right of the ESD/EOS line, while the values for non-damaged TMR sensors 3 and 9-32 (data points depicted in a darker shade) form a well-defined group left of the NORMAL line. Accordingly, the correlations in FIGS. 6A-6C can also be used to identify damaged TMR sensors among a group of TMR sensors (e.g., self-similar parts from the same production batch or within the same multi-sensor device) without preexisting knowledge of TMR sensors that are non-damaged. Furthermore, such experimentally determined values can be used to specify ranges of acceptable slopes and/or y-intercepts outside of which a TMR sensor should be regarded as damaged. For example, based on the data of FIG. 6C, a user may specify a range acceptable slopes of −0.14 to −0.40 (OHM/mA).

Figure 7A:
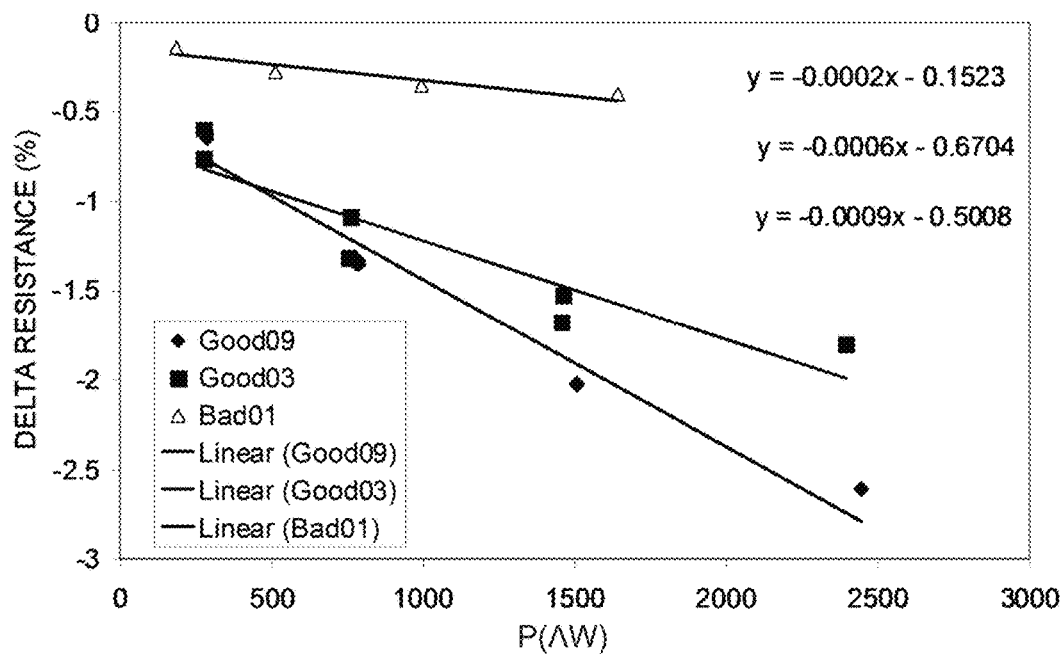
FIG. 7A is an example plot of the difference in resistance from the resistance at 1 mA versus power for two non-damaged TMR sensors and one damaged TMR sensor of the plurality of TMR sensors of FIG. 5A, in accordance with an embodiment of the present invention.

FIG. 7A is an example plot of the difference in resistance from the resistance at 1 mA (i.e., delta resistance) versus power upon application of negative polarity bias current for non-damaged TMR sensors 3 and 9 and damaged TMR sensor 1 of FIG. 5A, in accordance with an embodiment of the present invention. As shown, the y-intercept and slope for damaged TMR sensor 1 again vary significantly from those of non-damaged TMR sensors 3 and 9.

Figure 7B:
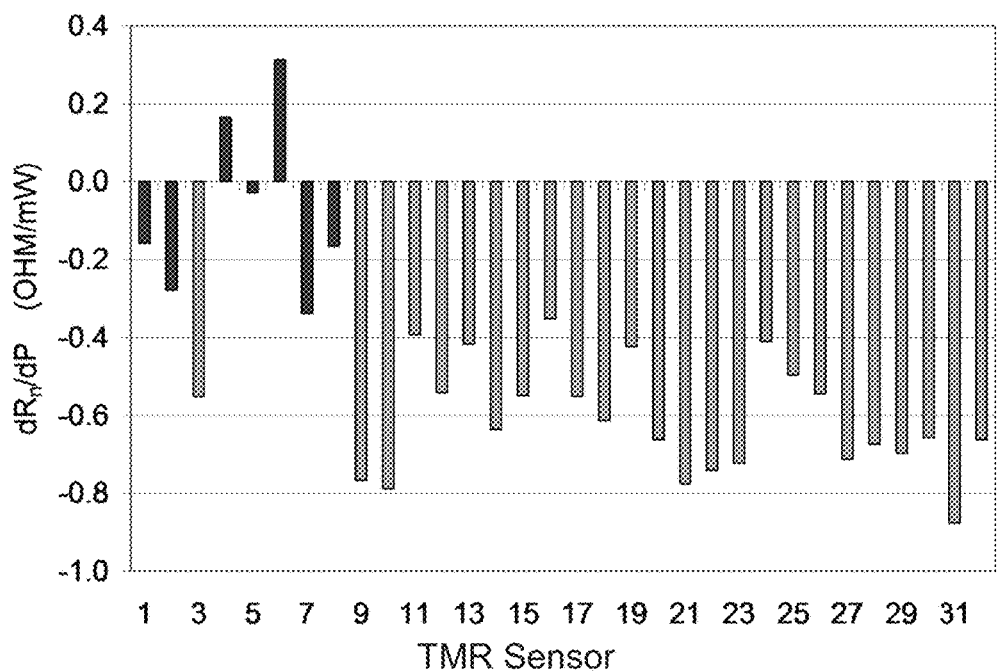
FIG. 7B is an example plot of the slope of resistance versus power for the plurality of damaged and non-damaged TMR sensors of FIG. 5A, in accordance with an embodiment of the present invention.

FIG. 7B is an example plot of the slope of resistance versus power (for negative polarity bias currents) for the plurality of damaged and non-damaged TMR sensors of FIG. 5A, in accordance with an embodiment of the present invention. As shown, the magnitudes of the slopes (i.e., $|dR_n/dP|$) for damaged TMR sensors 1, 2, and 4-8 (depicted in a darker shade) are significantly less than those of the non-damaged TMR sensors and, in some cases, the sign of $dR_n/dP$ has become positive (clearly damaged).

Figure 7C:
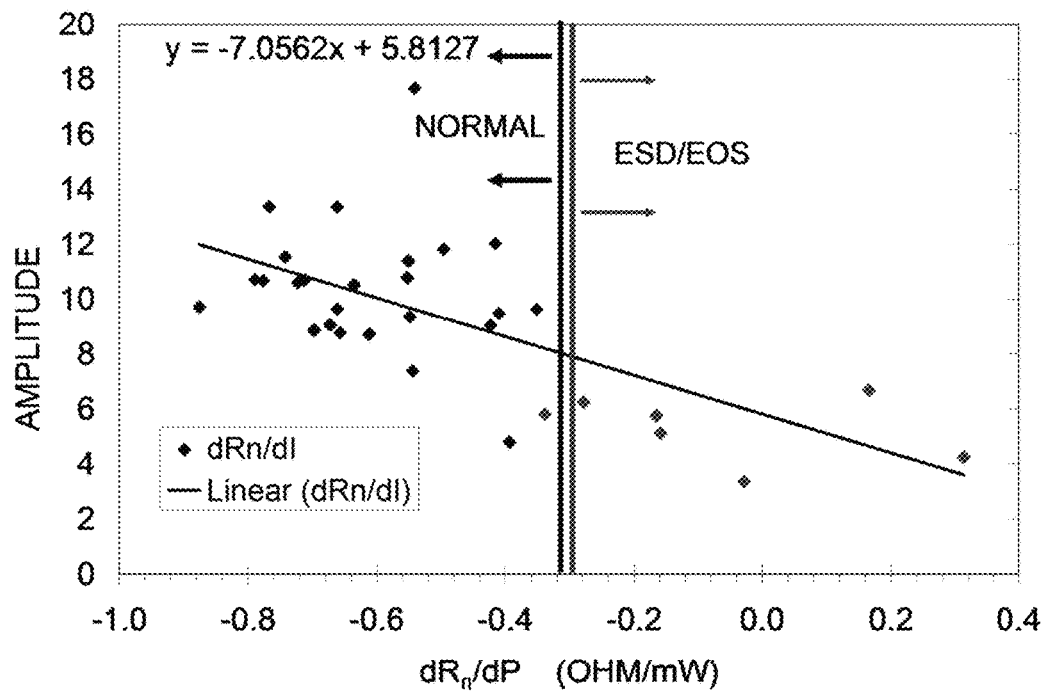
FIG. 7C is an example plot of amplitude versus the slope of resistance versus power for the plurality of damaged and non-damaged TMR sensors of FIG. 5A, in accordance with an embodiment of the present invention.

FIG. 7C is an example plot of amplitude versus the slope of resistance versus power (for negative polarity bias currents) for the plurality of damaged and non-damaged TMR sensors of FIG. 5A, in accordance with an embodiment of the present invention. As shown, values for damaged TMR sensors 1, 2, and 4-8 (data points depicted in a lighter shade) form a well-defined group right of the ESD/EOS line, while the values for non-damaged TMR sensors 3 and 9-32 (depicted in a darker shade) form a well-defined group left of the NORMAL line. Accordingly, the correlations in FIGS. 7A-7C can also be used to identify damaged TMR sensors among a group of TMR sensors (e.g., self-similar parts from the same production batch or within the same multi-sensor device) without preexisting knowledge of TMR sensors that are non-damaged.

Figure 8A:
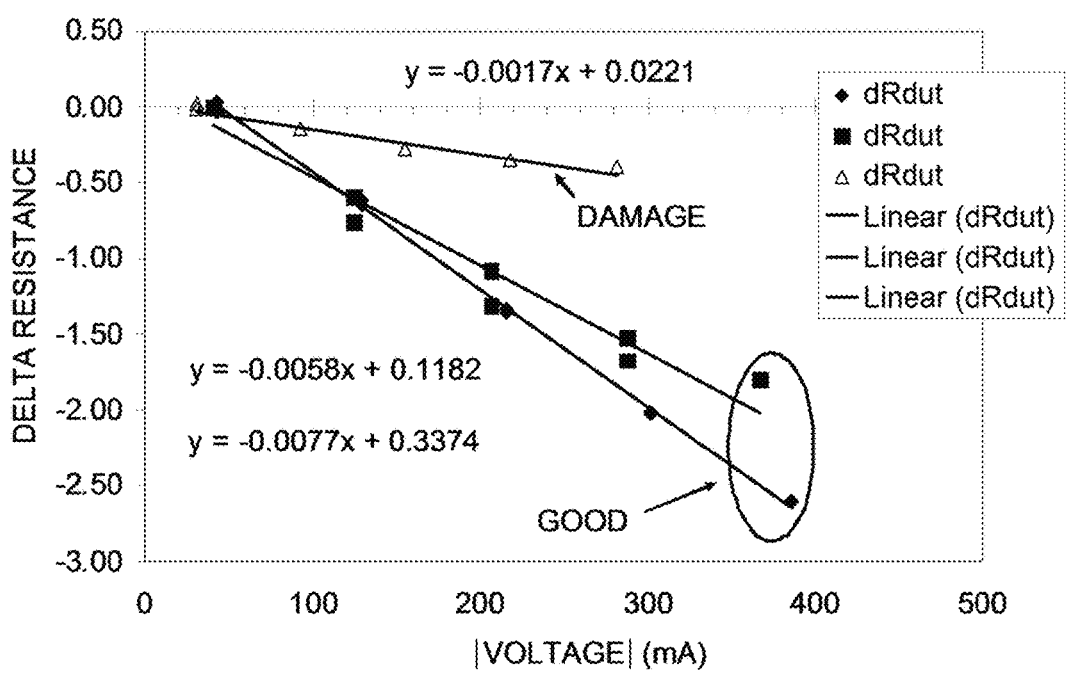
FIG. 8A is an example plot of the difference in resistance from the resistance at 1 mA versus magnitude of the voltage for two non-damaged TMR sensors and one damaged TMR sensor of the plurality of TMR sensors of FIG. 5A, in accordance with an embodiment of the present invention.

FIG. 8A is an example plot of the difference in resistance from the average resistance (i.e., delta resistance) versus voltage (for negative polarity bias currents) for non-damaged TMR sensors 3 and 9 and damaged TMR sensor 1 of FIG. 5A, in accordance with an embodiment of the present invention. As shown, the y-intercept and slope for damaged TMR sensor 1 again vary significantly from those of non-damaged TMR sensors 3 and 9.

Figure 8B:
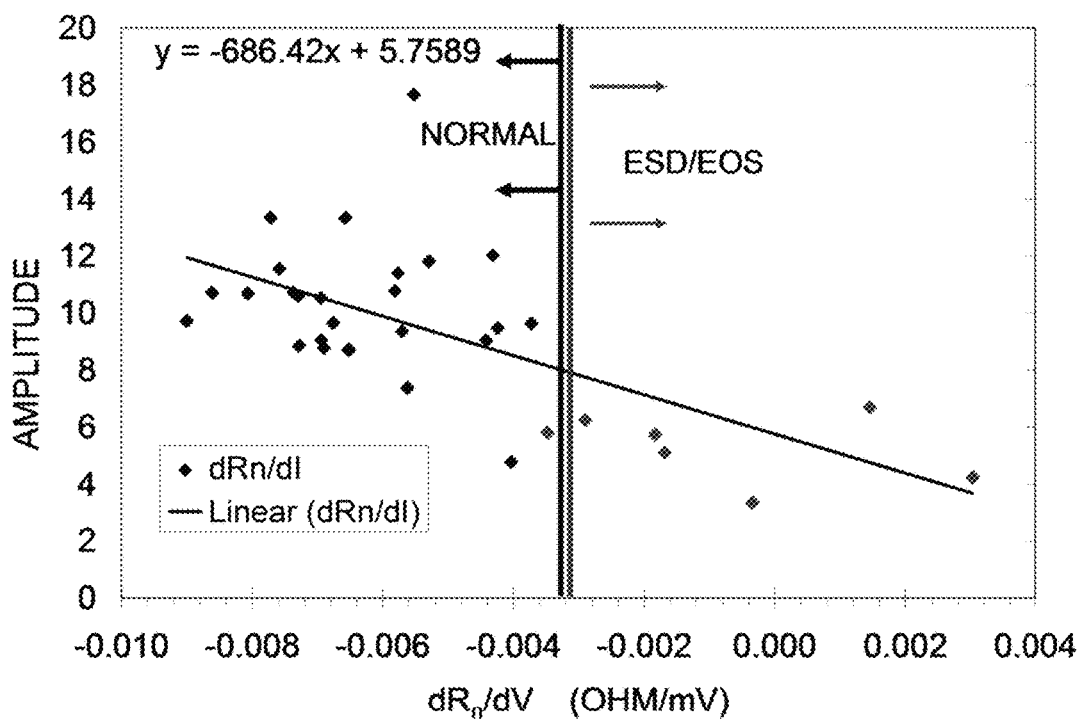
FIG. 8B is an example plot of amplitude versus the slope of resistance versus magnitude of the voltage for the plurality of damaged and non-damaged TMR sensors of FIG. 5A, in accordance with an embodiment of the present invention.

FIG. 8B is an example plot of amplitude versus the slope of resistance versus voltage (for negative polarity bias currents) for the plurality of damaged and non-damaged TMR sensors of FIG. 5A, in accordance with an embodiment of the present invention. As shown, values for damaged TMR sensors 1, 2, and 4-8 (data points depicted in a lighter shade) form a well-defined group right of the ESD/EOS line, while the values for non-damaged TMR sensors 3 and 9-32 (data points depicted in a darker shade) form a well-defined group left of the NORMAL line.

Figure 8C:
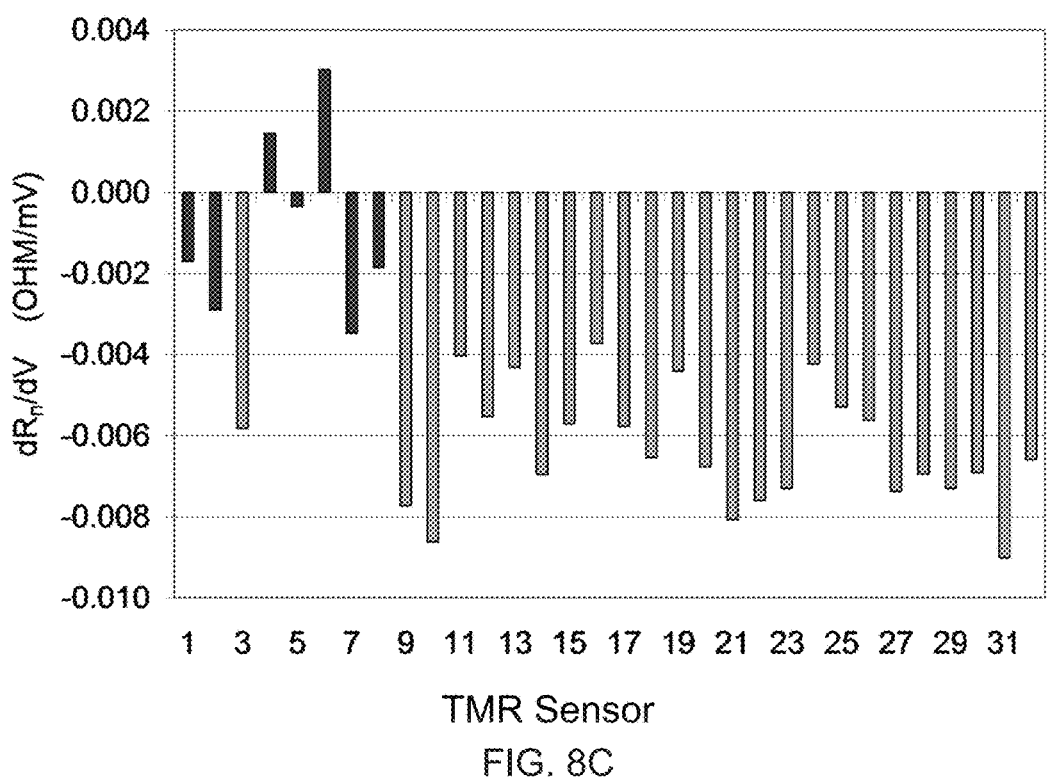
FIG. 8C is an example plot of the slope of resistance versus magnitude of the voltage versus TMR number for the plurality of damaged and non-damaged TMR sensors of FIG. 5A, in accordance with an embodiment of the present invention.

FIG. 8C is an example plot of the slope of resistance versus voltage (for negative polarity bias currents) for the plurality of damaged and non-damaged TMR sensors of FIG. 5A, in accordance with an embodiment of the present invention. As shown, the magnitudes of the slopes (i.e., $|dRn/dV|$) for damaged TMR sensors 1, 2, and 4-8 (depicted in a darker shade) are significantly less than those of the non-damaged TMR sensors. Accordingly, the correlations in FIGS. 8A-8C can also be used to identify damaged TMR sensors among a group of TMR sensors (e.g., self-similar parts from the same production batch or within the same multi-sensor device) without preexisting knowledge of TMR sensors that are non-damaged.

FIGS. 9A-9D are examples plot of cumulative fractions versus resistance, cumulative fractions versus the slope of resistance versus negative polarity bias current, cumulative fractions versus the slope of resistance versus voltage (for negative polarity bias current), and cumulative fractions versus the slope of resistance versus power (for negative polarity bias current), respectively, for the plurality of damaged and non-damaged TMR sensors of FIG. 5A, in accordance with an embodiment of the present invention. In these example plots, data points for damaged TMR sensors 1, 2, and 4-8 (data points depicted in a lighter shade) have been plotted separately from the data points for non-damaged TMR sensors 3 and 9-32 (data points depicted in a darker shade). As shown, after plotting cumulative fractions versus a desired parameter, a user can calculate one or more standard deviation values (e.g., 2 SIGMA, 3 SIGMA, 4 SIGMA, etc.), outside of which a TMR sensor should be regarded as damaged. For example, in FIG. 9A, the mean resistance for non-damaged TMR sensors 3 and 9-32 may be around 32 Ohms, with a 2 SIGMA value of 5 Ohms. In this example, then, TMR sensors having a resistance that differs from the median of 32 Ohms by greater than 5 Ohms can be regarded as being damaged. The same statistical analyses can be applied with regard to FIGS. 9B-9D.

As previously discussed, a variety of statistical techniques can be used to determine outliers from a normal distribution. For example, for this group of N=32 TMR sensors, one could first discard TMR sensors with the M highest and M lowest resistance values. A median resistance can be calculated along with the standard deviation ($\sigma_M$) of the remaining N−2M TMR sensors. One could then select all TMR sensors that are within $Q*\sigma_M$ of the median as follows:

Good: $R \geq \text{median}(R) - Q*\sigma_M$.     Formula 19

Bad: $R < \text{median}(R) - Q*\sigma_M$.     Formula 20

Figure 9A:
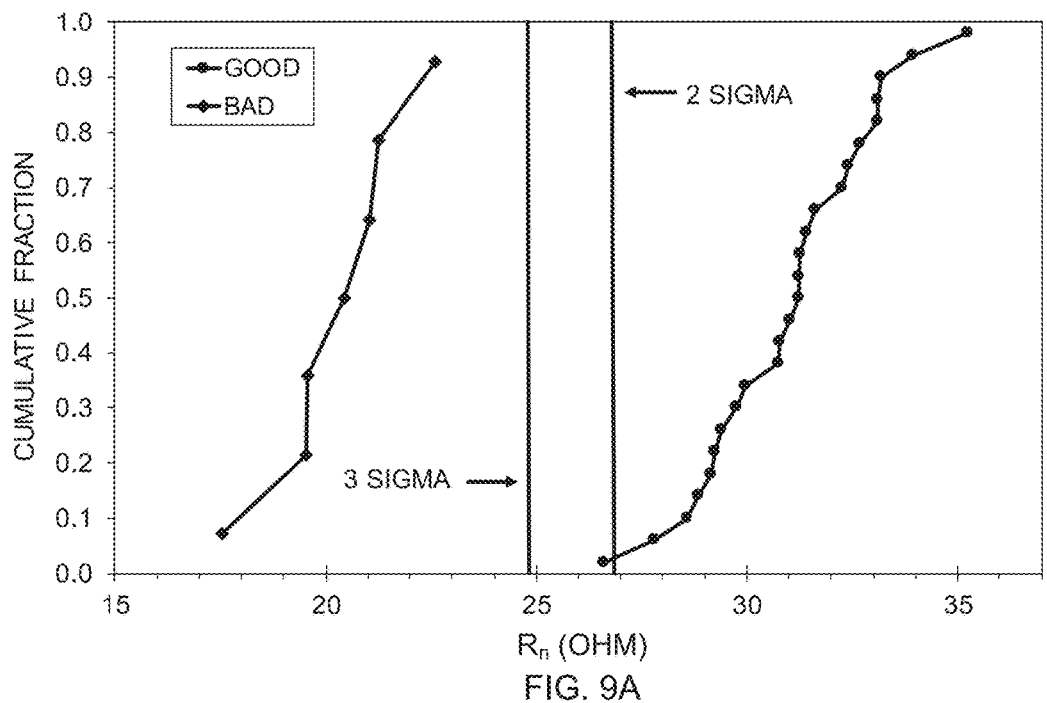
FIG. 9A is an example plot of cumulative fractions versus resistance for the plurality of damaged and non-damaged TMR sensors of FIG. 5A, in accordance with an embodiment of the present invention.
Figure 9B:
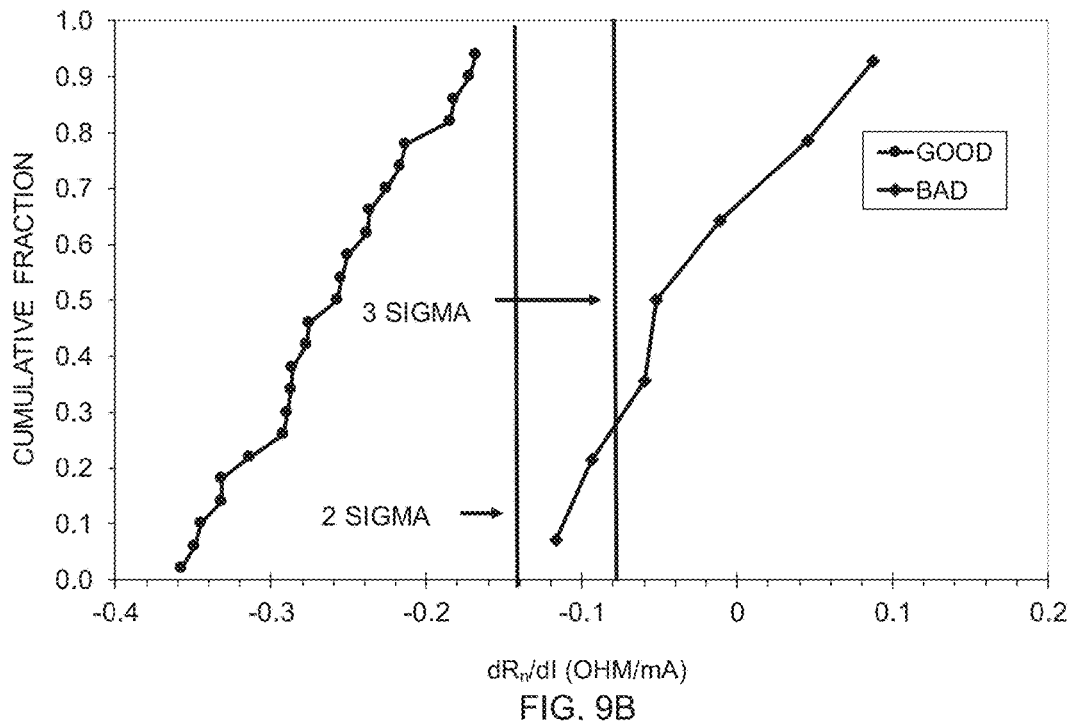
FIG. 9B is an example plot of cumulative fractions versus the slope of resistance versus magnitude of negative polarity bias current for the plurality of damaged and non-damaged TMR sensors of FIG. 5A, in accordance with an embodiment of the present invention.
Figure 9C:
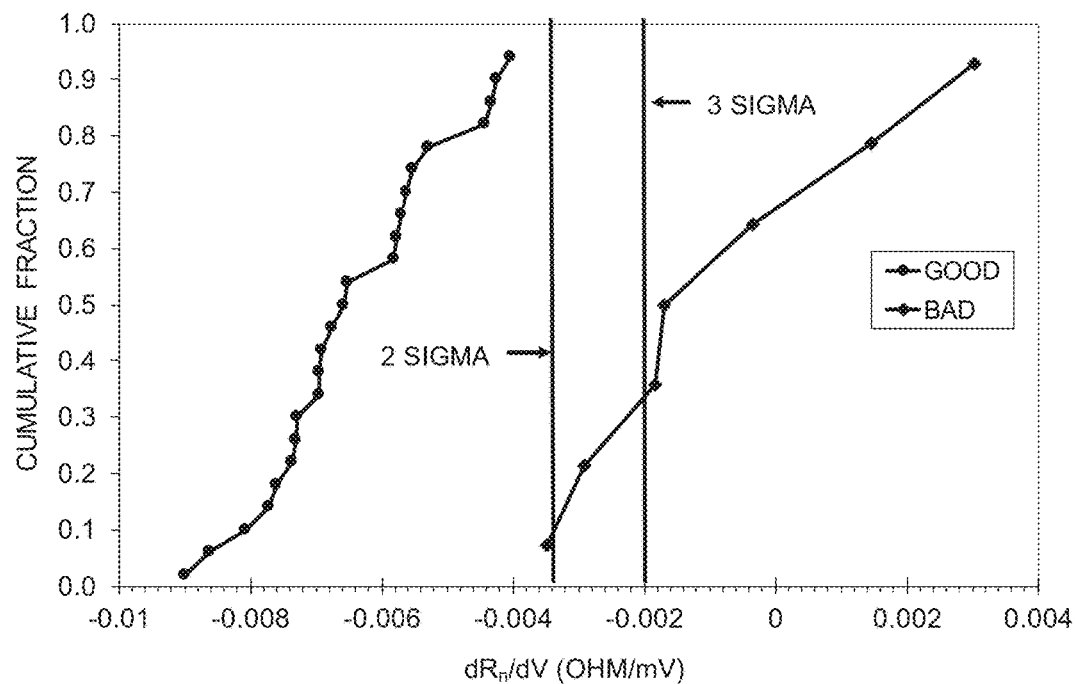
FIG. 9C is an example plot of cumulative fractions versus the slope of resistance versus magnitude of the voltage for the plurality of damaged and non-damaged TMR sensors of FIG. 5A, in accordance with an embodiment of the present invention.
Figure 9D:
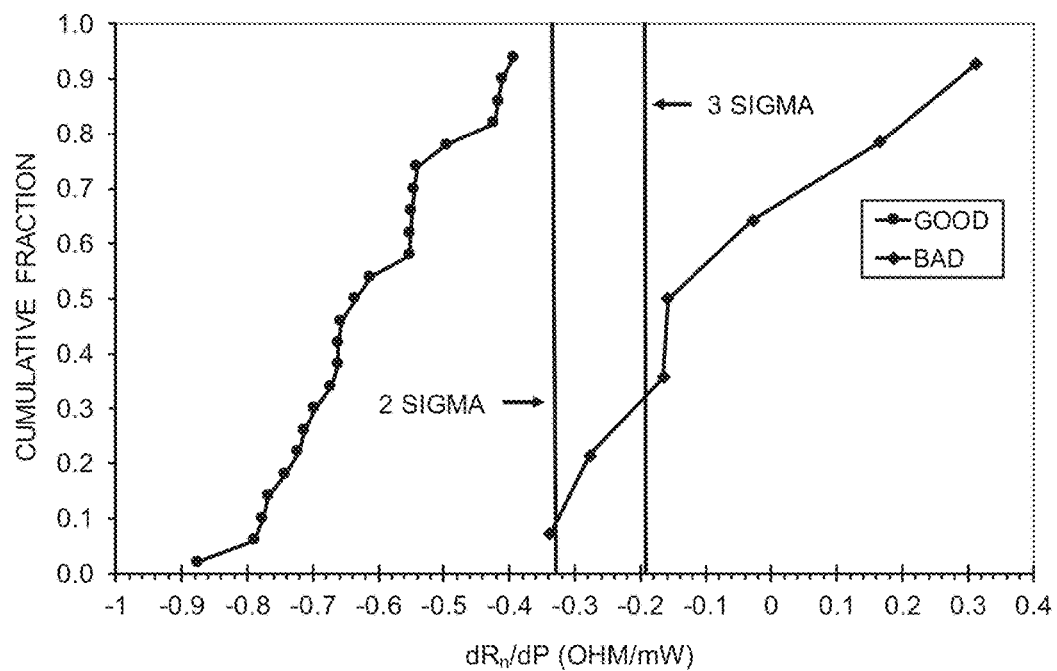
FIG. 9D is an example plot of cumulative fractions versus the slope of resistance versus power for the plurality of damaged and non-damaged TMR sensors of FIG. 5A, in accordance with an embodiment of the present invention.

For example, for the TMR sensors shown in FIGS. 5A, 5C and 9A, using Q=2.5, all of the damaged TMR sensors (i.e., TMR sensors 1, 2, 4, 5, 6, 7 and 8) will selected as Bad and all of the non-damaged TMR sensors will be selected as Good. Using the above-described algorithm, median(R) is 31.2 ohm and $\sigma_M$ is 2.0 ohm, so that median(R)−2.5*$\sigma_M$ is 26.2 ohm. In this example, the minimum resistance for Good TMR sensors is 26.6 ohm, which is greater than the limit criteria of 26.2 ohm. The maximum resistance of the Bad TMR sensors is 22.7 ohm, which is 3.5 ohm below the limit criteria. Thus, in this example, the above-described algorithm would be 100% effective at selecting the Bad TMR sensors and not falsely labeling a Good TMR sensor as Bad. In a manufacturing process, engineers can select an appropriate Q which best balances the profit and loss benefits of under- versus over-selection of Bad TMR sensors. In typical manufacturing lines of TMR sensors in the storage industry, the resistances for Good (i.e., non-damaged) TMR sensors can often span a range of about a factor of 2, while for TMR sensors lapped to a given resistance at the same time within adjacent devices (as was the case for these 32 example TMR sensors), the range of resistances is much tighter. Thus, if these example TMR sensors represent the average resistance for the product, one would expect Good TMR sensors to have resistances between 21 and 42 ohms, which would include 4 of the 7 damaged TMR sensors (i.e., high under-selection of Bad TMR sensors). Accordingly, using the statistics of neighbors can be highly advantageous.

Figure 10A:
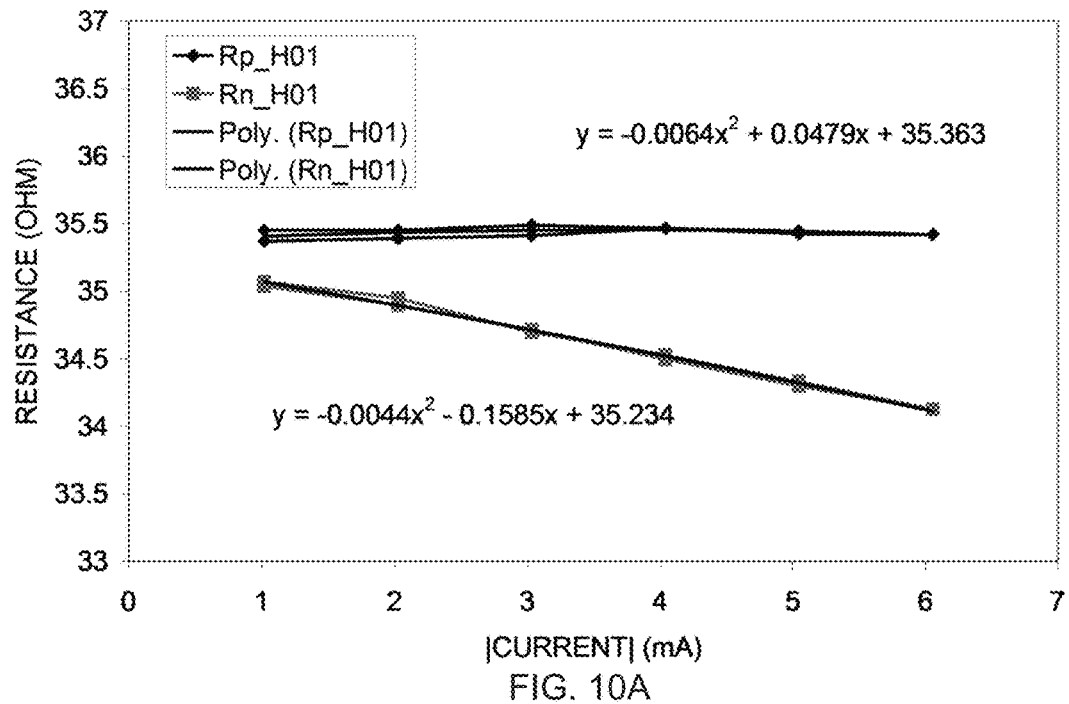
FIG. 10A is an example plot of resistance versus magnitude of bias current for positive and negative polarity bias currents for a non-damaged TMR sensor, in accordance with an embodiment of the present invention.

FIG. 10A is an example plot of resistance versus bias currents of positive and negative polarities for a non-damaged TMR sensor (H01), in accordance with an embodiment of the present invention. In this example, bias currents of positive polarity were swept up from 1 to 6 mA and back down to 1 mA, and bias currents of negative polarity were swept up from 1 to 6 mA and back down to 1 mA. As shown, the polynomial fits to R(I_j) for both positive and negative polarity currents are smooth since $P_{error_{2n}}$ and $P_{error_{2p}}$ are within normal ranges and thus do not show any significant kinks or hysteresis loops in the curve. Also, the differences between deviations for each given current magnitude when arrived at from both directions (i.e., D(I_j)) are small. Accordingly, this example plot lacks a hysteresis loop and indicates an absence of magnetic domains and/or other magnetic damage in the TMR sensor. The close fit to the {R(I_j)} data with a polynomial of second order and the low values for Favg, Fmax, and Fsqr are reflected in the smooth transfer curve shown in FIG. 10D for TMR H01, also labeled "smooth".

Figure 10B:
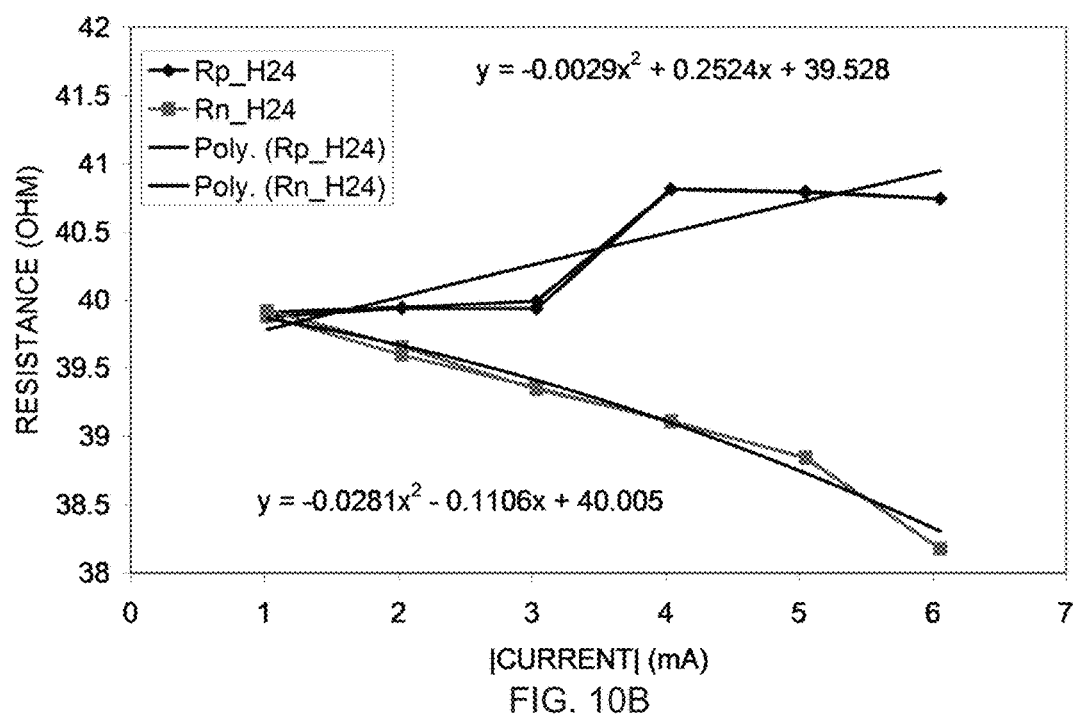
FIG. 10B is an example plot of resistance versus magnitude of bias current for positive and negative polarity bias currents for a damaged TMR sensor, in accordance with an embodiment of the present invention.

FIG. 10B is an example plot of resistance versus bias currents of positive and negative polarities for a damaged TMR sensor (H24), in accordance with an embodiment of the present invention. In this example, bias currents of positive polarity were swept up from 1 to 6 mA and back down to 1 mA, and bias currents of negative polarity were swept up from 1 to 6 mA and back down to 1 mA. As shown, the polynomial fit for negative polarity bias currents is smooth since $P_{error_{2n}}$ is within normal range, as seen in FIG. 10E. On the other hand, a second order polynomial fit to {R(I_j)} for positive polarity bias currents includes a "kink" in the curve such that $P_{error_{2p}}$ is relatively large, as seen in FIG. 10E. The kink in the polynomial fit for positive polarity bias currents indicates damage to the TMR sensor, which is also visible in the transfer curve plotted in FIG. 10D for H24. For both polynomial fits, the differences between deviations for each given current magnitude when arrived at from both directions (i.e., D(I_j)) are small and Favg, Fmax, and Fsqr for {D(I_j)} are all within normal ranges. Accordingly, this example plot lacks a hysteresis loop, which is another form of magnetic damage.

Figure 10C:
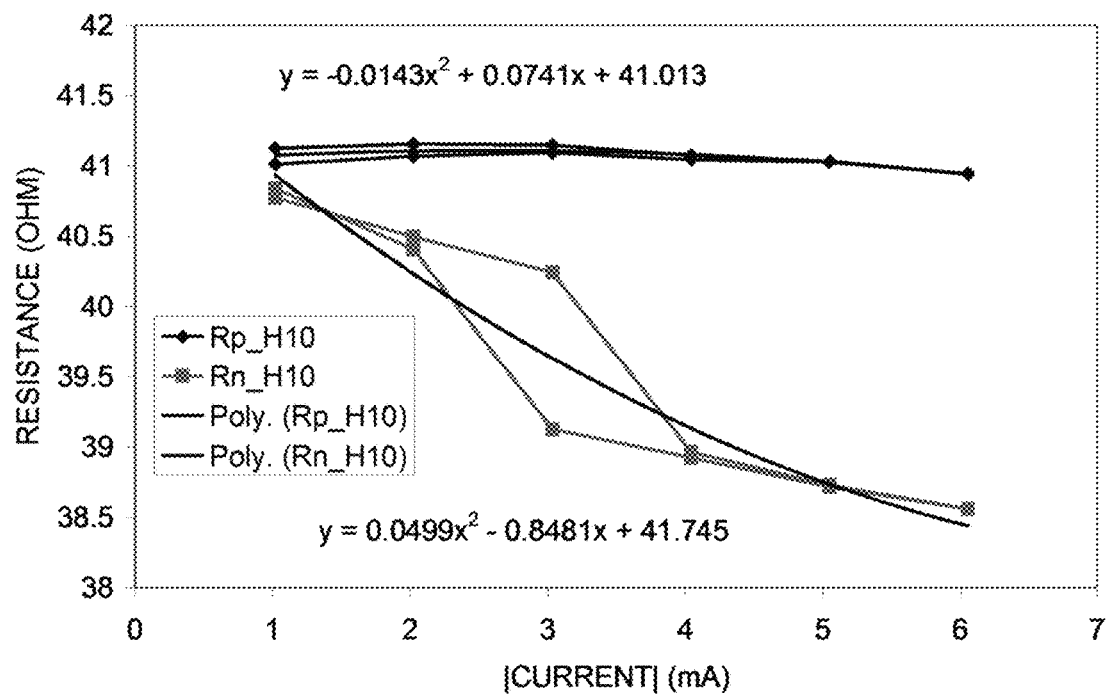
FIG. 10C is an example plot of resistance versus magnitude of bias current for positive and negative polarity bias currents for a damaged TMR sensor, in accordance with an embodiment of the present invention.

FIG. 10C is an example plot of resistance versus bias currents of positive and negative polarities for a damaged TMR sensor (H10), in accordance with an embodiment of the present invention. In this example, bias currents of positive polarity were swept up from 1 to 6 mA and back down to 1 mA, and bias currents of negative polarity were swept up from 1 to 6 mA and back down to 1 mA. As shown, the polynomial fit for positive polarity bias currents is smooth since $P_{error_{2p}}$ is within normal range, while the polynomial fit for negative polarity bias currents includes a kink since $P_{error_{2n}}$ is much larger than the normal range, as seen in FIG. 10E. The excessive loop is seen in FIG. 10E as the "LOOP" for H10_n when compared to normal TMRs of H01_p, H10_p, H01_n and H20_n ("n" and "p" refer to negative and positive polarity respectively for TMRs H01, H10, and H24). Furthermore, for negative polarity bias currents, there are large differences between deviations for each given current magnitude when arrived at from one direction (i.e., sweeping current up from 1 mA to 6 mA) and when arrived at from the other direction (i.e., sweeping current down from 6 mA to 1 mA). Most notably, D(I_{j=3mA}) is large, exceeding 1 Ohm. The large value of D(I_{j=3mA}) for negative polarity sweeps will be captured using any of the functions Favg, Fmax, and Fsqr. Thus, the hysteresis loops are detected both in the deviation of the fit of {R(I_j)} to a second order polynomial and using the functions Favg, Fmax, and Fsqr. The hysteresis loop is also revealed by the functions Favg, Fmax, and Fsqr, whereas the kink for H24_p of FIG. 10B does not exhibit the hysteresis loop since Favg, Fmax, and Fsqr are all within normal ranges. The clear hysteresis loop shown for H10_p is indicative of magnetic domains in the TMR sensor and demonstrates value of sweeping bias currents up and down a range of operating currents. Furthermore, this example plot demonstrates value of analyzing resistances of TMR sensors upon application of negative polarity bias current because, as shown here, damage to a TMR sensor may not be reflected in an analysis of positive polarity bias currents alone. It is suspected that the hysteresis loop showing up for the negative polarity curve results from the self-generated field from the bias currents.

Figure 10D:
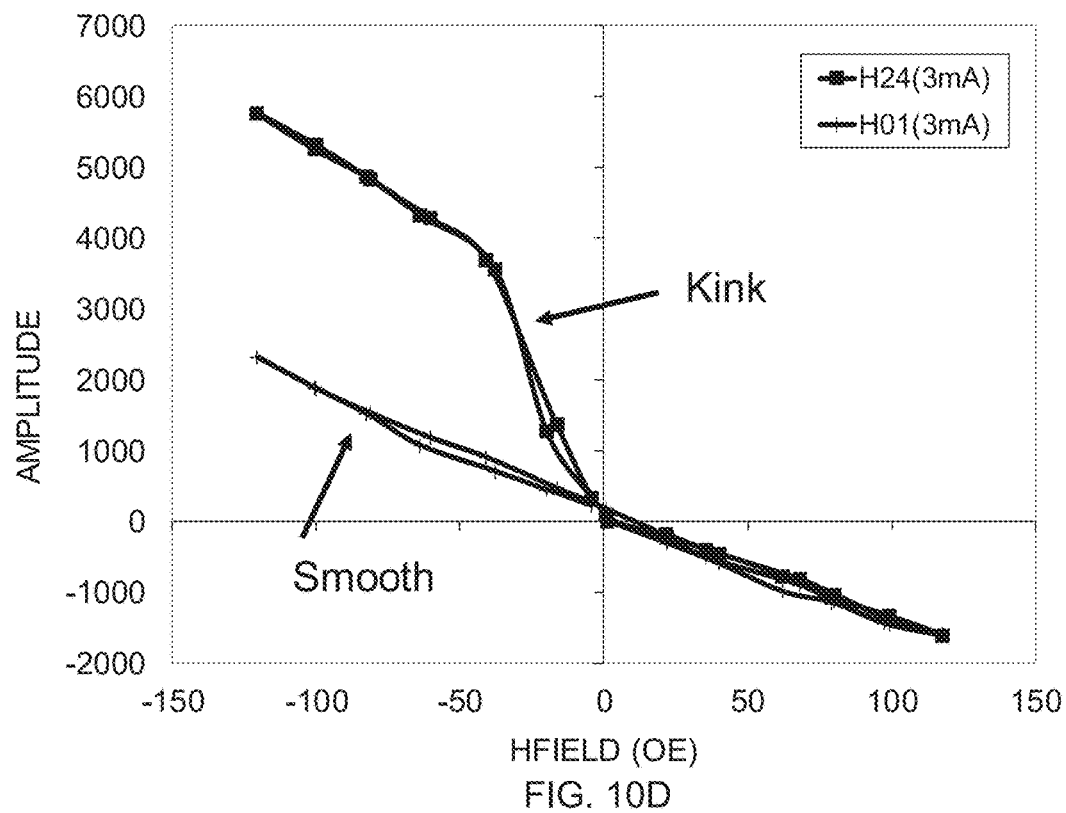
FIG. 10D is an example plot of amplitude versus magnetic field for the damaged and non-damaged TMR sensors of FIGS. 10A and 10B, in accordance with an embodiment of the present invention.
Figure 10E:
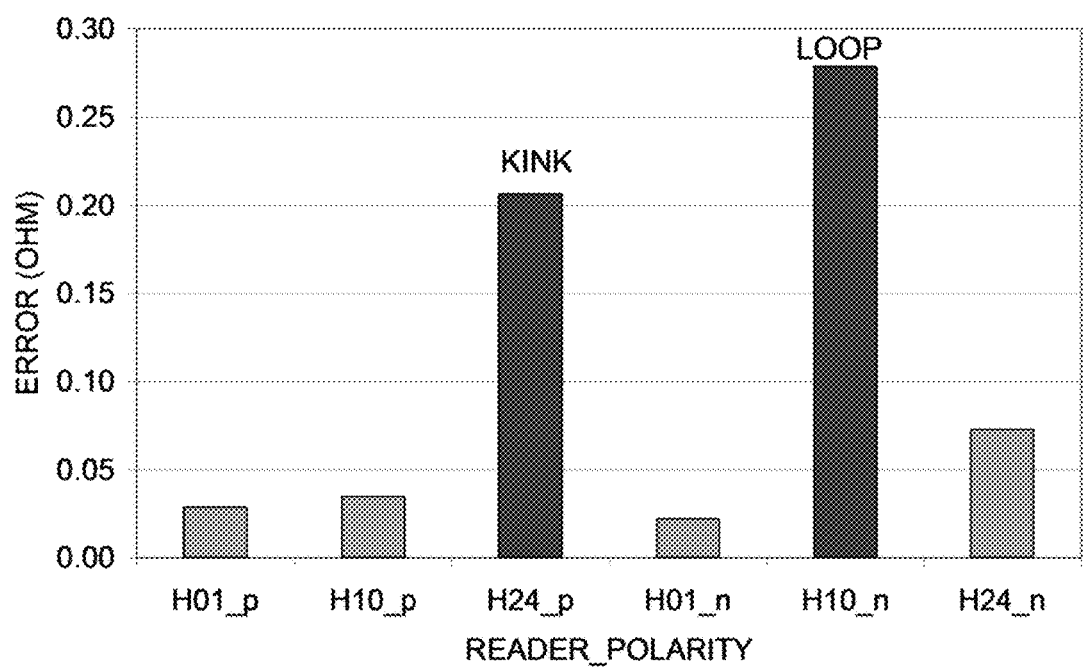
FIG. 10E is an example plot of error in resistance data to the best quadratic fit versus the TMR sensors of FIGS. 10A-D, in accordance with an embodiment of the present invention.

FIG. 10D is an example plot (i.e., a transfer curve) of amplitude versus magnetic field for the non-damaged TMR sensor (H01) of FIG. 10A and the damaged TMR sensor (H24) of FIG. 10B. As shown, a kink is visible for the damaged TMR sensor (H24) of FIG. 10B, which also corresponds to the kink in the polynomial fit for positive polarity bias current seen in FIG. 10B, while the curve for the non-damaged TMR sensor (H01) of FIG. 10A is smooth, just as the polynomial fit to {R(I_j)} for TMR sensor H01 was smooth.

FIG. 10E is an example plot of error in resistance data to the best quadratic polynomial fit versus the TMR sensors of FIGS. 10A-D, in accordance with an embodiment of the present invention. As shown, the largest error in measured resistance data from the quadratic polynomial fit occurred for the damaged TMR sensor of FIG. 10C upon application of negative polarity bias currents, which resulted in the kink and hysteresis loop seen in FIG. 10C. The second largest error in measured resistance data from the quadratic polynomial fit occurred for the damaged TMR sensor of FIG. 10B upon application of positive polarity bias currents, which resulted in the kink seen in FIG. 10B. The errors in the polynomial fit for H24_p and H10_n are over five times the average errors for the normal curves for H01_p, H01_n, H10_p and H24_n.

Figure 11:
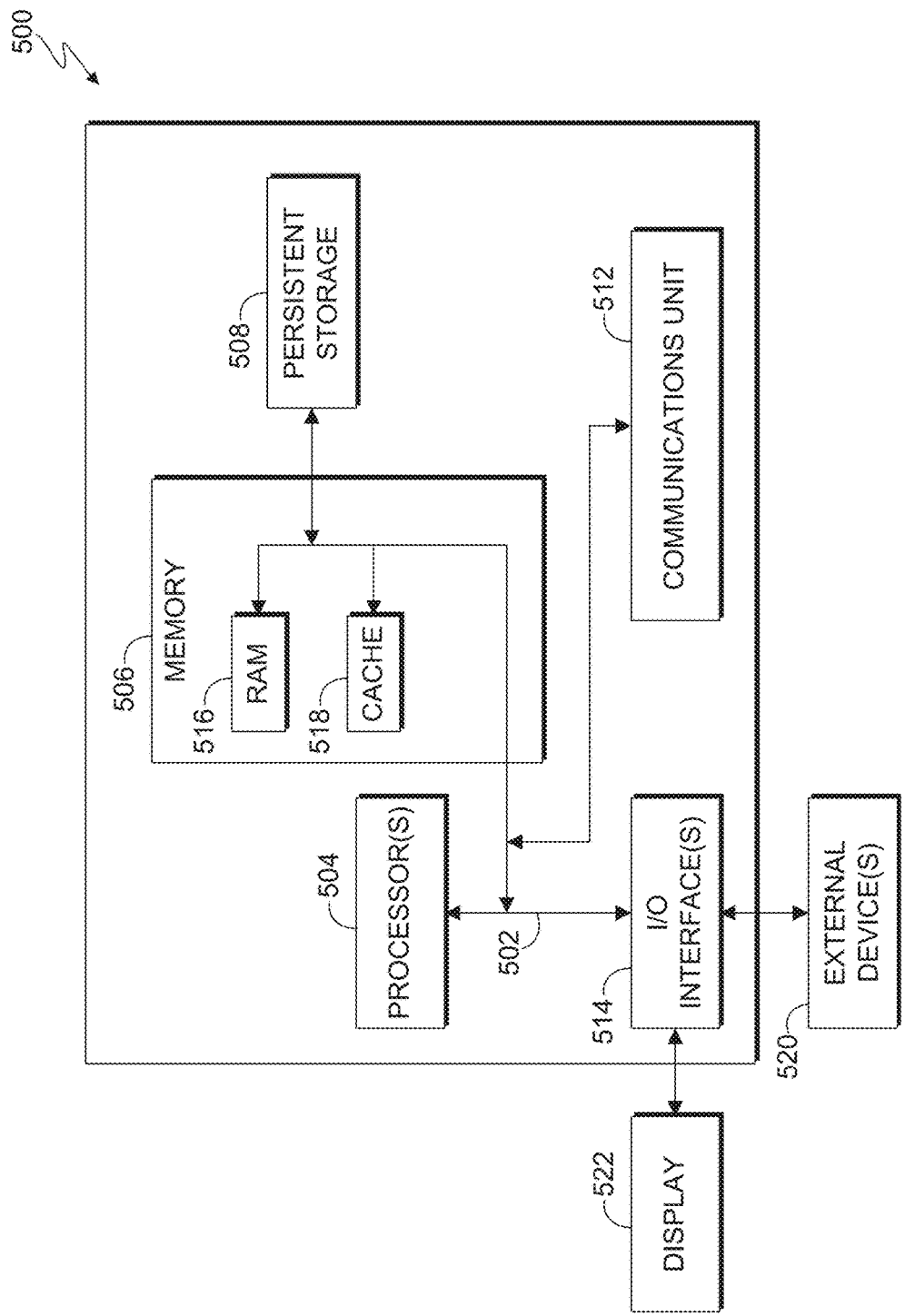
FIG. 11 is a block diagram of internal and external components of the computer systems of FIG. 1, in accordance with an embodiment of the present invention.

FIG. 11 is a block diagram of internal and external components of a computer system 500, which is representative the computer systems of FIG. 1, in accordance with an embodiment of the present invention. It should be appreciated that FIG. 11 provides only an illustration of one implementation and does not imply any limitations with regard to the environments in which different embodiments may be implemented. In general, the components illustrated in FIG. 11 are representative of any electronic device capable of executing machine-readable program instructions. Examples of computer systems, environments, and/or configurations that may be represented by the components illustrated in FIG. 11 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software (e.g., testing program 104) is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network. In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 512 (e.g., via the Internet, a local area network or other wide area network). From communications unit 512, the software and data can be loaded onto persistent storage 508.

One or more I/O interface(s) 514 allow for input and output of data with other devices that may be connected to computer system 500. For example, I/O interface(s) 514 can provide a connection to one or more external devices 520 such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface(s) 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    applying, one or both of negative polarity current and positive polarity current to a first contact and a second contact of a first tunneling magnetoresistance (TMR) sensor at a first plurality of current magnitudes, where the first plurality of current magnitudes comprises at least three current magnitudes and the current traverses a plurality of layers of the first TMR sensor;
    determining, by one or more computer processors, resistances of the first TMR sensor based, at least in part, on the application of one or both of negative polarity current and positive polarity current;
    calculating, by the one or more computer processors, a slope and a zero-current intercept for the determined resistances of the first TMR sensor at the first plurality of current magnitudes;
    determining, by the one or more computer processors, whether at least one of the calculated slope and the zero-current intercept for the determined resistances are outside of a specified range of values; and
    responsive to determining that at least one of the calculated slope and the zero-current intercept are outside of the specified range of values, identifying, by the one or more computer processors, the first TMR sensor as damaged;

wherein the one or both of negative polarity current and positive polarity current interact with defects in the first TMR sensor when applied to the first TMR sensor to influence the determined resistances.

2. The method of claim 1, wherein the first plurality of current magnitudes are swept from a first current magnitude through one or more intermediate magnitudes to a second current magnitude, and then back to the first current magnitude through the one or more intermediate magnitudes to identify one or more magnetic domains in the first TMR sensor.

3. The method of claim 2, wherein the first current magnitude, the second current magnitude, and the one or more intermediate magnitudes are safe operational current magnitudes used for the first TMR sensor.

4. The method of claim 1, further comprising:
performing a nearest neighbor analysis in which the determined resistances of the first TMR sensor are compared to resistances of one or more adjacent TMR sensors within a multi-sensor device.

5. The method of claim 1, further comprising:
determining, by one or more computer processors, resistances of a second tunneling magnetoresistance (TMR) sensor upon application of one or both of negative polarity current and positive polarity current at a second plurality of current magnitudes, wherein the second plurality of current magnitudes comprises at least three current magnitudes;
calculating, by one or more computer processors, a slope and a zero-current intercept for the determined resistances of the second TMR sensor at the second plurality of current magnitudes;
determining, by one or more computer processors, whether a difference between the calculated slope of the first TMR sensor and the calculated slope of the second TMR sensor exceeds a specified value; and
responsive to determining that the difference between the calculated slope of the first TMR sensor and the calculated slope of the second TMR sensor exceeds a specified value, identifying, by one or more computer processors, the first TMR sensor as damaged.

6. The method of claim 1, wherein calculating, by one or more computer processors, a slope and a zero-current intercept for the determined resistances of the TMR sensor at the first plurality of current magnitudes comprises:
calculating, by one or more computer processors, a slope and a zero-current intercept for at least one of the determined resistances of the TMR sensor versus the first plurality of current magnitudes, the determined resistances of the TMR sensor versus power in the TMR sensor at the first plurality of current magnitudes, the determined resistances of the TMR sensor versus the calculated voltage in the TMR sensor at the first plurality of current magnitudes, and the determined resistances of the TMR sensor versus the calculated voltage in the TMR sensor at the first plurality of current magnitudes, by creating a polynomial fit for the first resistance data.

7. The method of claim 6, further comprising:
calculating, by one or more computer processors, deviations of the first resistance data from the polynomial fit;
determining, by one or more computer processors, whether the calculated deviations of the first resistance data from the polynomial fit exceed a specified value; and
responsive to determining that the calculated deviations of the first resistance data from the polynomial fit exceed a specified value, identifying, by one or more computer processors, the first TMR sensor as damaged.

8. The method of claim 6, further comprising:
determining, by one or more computer processors, a first resistance corresponding to the first TMR sensor at a first magnitude of applied current when sweeping from a second magnitude of applied current to the first magnitude, wherein the second magnitude is lower than the first magnitude;
determining, by one or more computer processors, a second resistance corresponding to the first TMR sensor at the first magnitude when sweeping from a third magnitude of applied current to the first magnitude, wherein the third magnitude is higher than the first magnitude;
calculating, by one or more computer processors, a difference between the first resistance and the second resistance; and
determining, by one or more computer processors, whether the first TMR sensor is damaged based, at least in part, on the calculated difference.

9. The method of claim 6, further comprising:
determining, by one or more computer processors, a first plurality of resistances of the first TMR sensor at a plurality of intermediate magnitudes of applied current when sweeping from a first magnitude of applied current to a second magnitude of applied current, wherein the first magnitude is lower than the second magnitude;
determining, by one or more computer processors, a second plurality of resistances of the first TMR sensor at the plurality of intermediate magnitudes of applied current when sweeping from the second magnitude to the first magnitude;
calculating, by one or more computer processors, differences between the first plurality of resistances and the second plurality of resistances at each of the plurality of intermediate magnitudes of applied current; and
determining, by one or more computer processors, whether the first TMR sensor is damaged based, at least in part, on at least one of a maximum difference of the calculated differences, an average difference of the calculated differences, and an average of squares of the calculated differences.

10. A computer program product comprising:
a non-transitory computer readable storage medium; and
computer code stored on the non-transitory computer readable storage medium, with the computer code including instructions for causing a processor to perform operations including the following:
applying, one or both of negative polarity current and positive polarity current to a first contact and a second contact of a first tunneling magnetoresistance (TMR) sensor at a first plurality of current magnitudes, where the first plurality of current magnitudes comprises at least three current magnitudes and the current traverses a plurality of layers of the first TMR sensor;
determining resistances of the first TMR sensor based, at least in part, on the application of one or both of negative polarity current and positive polarity current;
calculating a slope and a zero-current intercept for the determined resistances of the first TMR sensor at the first plurality of current magnitudes;

determining whether at least one of the calculated slope and the zero-current intercept are outside of a specified range of values; and responsive to determining that at least one of the calculated slope and the zero-current intercept are outside of the specified range of values, identifying the first TMR sensor as damaged;

wherein the one or both of negative polarity current and positive polarity current interact with defects in the first TMR sensor when applied to the first TMR sensor to influence the determined resistances.

11. The computer program product of claim 10, wherein the first plurality of current magnitudes are swept from a first current magnitude through one or more intermediate magnitudes to a second current magnitude, and then back to the first current magnitude through the one or more intermediate magnitudes to identify one or more magnetic domains in the first TMR sensor.

12. The computer program product of claim 10, wherein the computer code stored on the non-transitory computer readable storage medium includes further instructions for causing the processor to perform the following operations:

performing a nearest neighbor analysis in which the determined resistances of the first TMR sensor are compared to resistances of one or more adjacent TMR sensors within a multi-sensor device.

13. The computer program product of claim 10, wherein the computer code stored on the non-transitory computer readable storage medium including instructions for calculating a slope and a zero-current intercept for the determined resistances of the TMR sensor at the plurality of current magnitudes further includes instructions for causing the processor to perform the following operations:

calculating a slope and a zero-current intercept for at least one of the determined resistances of the TMR sensor versus the first plurality of current magnitudes, the determined resistances of the TMR sensor versus power in the TMR sensor at the first plurality of current magnitudes, the determined resistances of the TMR sensor versus the calculated voltage in the TMR sensor at the first plurality of current magnitudes, and the determined resistances of the TMR sensor versus the calculated voltage in the TMR sensor at the first plurality of current magnitudes, by creating a polynomial fit for the first resistance data.

14. The computer program product of claim 13, wherein the computer code stored on the non-transitory computer readable storage medium further includes instructions for causing the processor to perform the following operations:

calculating deviations of the first resistance data from the polynomial fit;

determining whether the calculated deviations of the first resistance data from the polynomial fit exceed a specified value; and responsive to determining that the calculated deviations of the first resistance data from the polynomial fit exceed a specified value, identifying the first TMR sensor as damaged.

15. The computer program product of claim 13, wherein the computer code stored on the non-transitory computer readable storage medium includes further instructions for causing the processor set to perform the following operations:

determining a first resistance corresponding to the first TMR sensor at a first magnitude of applied current when sweeping from a second magnitude of applied current to the first magnitude, wherein the second magnitude is lower than the first magnitude;

determining a second resistance corresponding to the first TMR sensor at the first magnitude when sweeping from a third magnitude of applied current to the first magnitude, wherein the third magnitude is higher than the first magnitude;

calculating a difference between the first resistance and the second resistance; and determining whether the first TMR sensor is damaged based, at least in part, on the calculated difference.

16. A computer system comprising:

one or more computer processors;

one or more non-transitory computer readable storage media;

program instructions stored on the non-transitory computer readable storage media for including instructions for causing the one or more computer processors to perform operations including the following:

applying, one or both of negative polarity current and positive polarity current to a first contact and a second contact of a first tunneling magnetoresistance (TMR) sensor at a first plurality of current magnitudes, where the first plurality of current magnitudes comprises at least three current magnitudes and the current traverses a plurality of layers of the first TMR sensor;

determining resistances of a the first TMR sensor based, at least in part, on the application of one or both of negative polarity current and positive polarity current;

calculating a slope and a zero-current intercept for the determined resistances of the first TMR sensor at the first plurality of current magnitudes;

determining whether at least one of the calculated slope and the zero-current intercept are outside of a specified range of values; and responsive to determining that at least one of the calculated slope and the zero-current intercept are outside of the specified range of values, identifying the first TMR sensor as damaged;

wherein the one or both of negative polarity current and positive polarity current interact with defects in the first TMR sensor when applied to the first TMR sensor to influence the determined resistances.

17. The computer system of claim 16, wherein the first plurality of current magnitudes are swept from a first current magnitude through one or more intermediate magnitudes to a second current magnitude, and then back to the first current magnitude through the one or more intermediate magnitudes to identify one or more magnetic domains in the first TMR sensor.

18. The computer system of claim 16, wherein the program instructions stored on the non-transitory computer readable storage media further includes instructions for causing the one or more processors to perform the following operations:

performing a nearest neighbor analysis in which the determined resistances of the first TMR sensor are compared to resistances of one or more adjacent TMR sensors within a multi-sensor device.

19. The computer system of claim 16, wherein the program instructions stored on the non-transitory computer readable storage medium including instructions for causing the one or more processors to calculate a slope and a zero-current intercept for the determined resistances of the TMR sensor at the plurality of current magnitudes includes further instructions for causing the one or more processors to perform the following operations:

calculating a slope and a zero-current intercept for at least one of the determined resistances of the TMR sensor versus the first plurality of current magnitudes, the determined resistances of the TMR sensor versus power in the TMR sensor at the first plurality of current magnitudes, the determined resistances of the TMR sensor versus the calculated voltage in the TMR sensor at the first plurality of current magnitudes, and the determined resistances of the TMR sensor versus the calculated voltage in the TMR sensor at the first plurality of current magnitudes, by creating a polynomial fit for the first resistance data.

20. The computer system of claim 19, wherein the program instructions stored on the non-transitory computer readable storage media further includes instructions for causing the one or more processors to perform the following operations:

calculating deviations of the first resistance data from the polynomial fit;
    determining whether the calculated deviations of the first resistance data from the polynomial fit exceed a specified value; and
    responsive to determining that the calculated deviations of the first resistance data from the polynomial fit exceed a specified value, identifying the first TMR sensor as damaged.

\* \* \* \* \*